United States Patent
Nagahara et al.

(10) Patent No.: US 9,805,486 B2
(45) Date of Patent: Oct. 31, 2017

(54) IMAGE-DRAWING PROCESSING SYSTEM, SERVER, USER TERMINAL, IMAGE-DRAWING PROCESSING METHOD, PROGRAM, AND STORAGE MEDIUM

(75) Inventors: Takanori Nagahara, Kanagawa (JP); Junichi Takami, Kanagawa (JP); Shiroh Ikegami, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1699 days.

(21) Appl. No.: 12/950,420

(22) Filed: Nov. 19, 2010

(65) Prior Publication Data

US 2011/0126129 A1    May 26, 2011

(30) Foreign Application Priority Data

Nov. 20, 2009   (JP) ................................. 2009-265068
Aug. 23, 2010   (JP) ................................. 2010-186567

(51) Int. Cl.
  *G06F 3/0488*   (2013.01)
  *G06T 11/60*   (2006.01)
  *G06K 9/00*   (2006.01)
  *G06K 9/22*   (2006.01)

(52) U.S. Cl.
  CPC ............ *G06T 11/60* (2013.01); *G06F 3/0488* (2013.01); *G06K 9/00416* (2013.01); *G06K 9/00429* (2013.01); *G06K 9/222* (2013.01)

(58) Field of Classification Search
  CPC ...... G06T 11/20; G06T 11/203; G06T 11/206; G06T 11/60; G06T 11/80
  See application file for complete search history.

(56) References Cited

U.S. PATENT DOCUMENTS 4,633,436 A  * 12/1986 Flurry ........................... 345/179
5,182,548 A  *  1/1993 Haeberli ....................... 345/639
(Continued)

FOREIGN PATENT DOCUMENTS

EP     0 782 066 A2    7/1997
JP     06-324795       11/1994
(Continued)

OTHER PUBLICATIONS

Japanese Office Action dated Mar. 4, 2014, in Japan Patent Application No. 2010-186567.
(Continued)

*Primary Examiner* — Ajay Bhatia
*Assistant Examiner* — Phoebe Pan
(74) *Attorney, Agent, or Firm* — Oblon, McClelland, Maier & Neustadt, L.L.P.

(57) ABSTRACT

A user terminal apparatus includes an input receiver, an intersecting-image information obtaining unit and a divider. The input receiver receives input information relating to image-drawing and image-erasing. The intersecting-image information obtaining unit obtains image-drawing input information intersecting image-erasing input information as intersecting-image information when the input receiver receives image-erasing input information. The divider divides the intersecting-image information to erase a portion of the intersecting-image information contained in an erasing area computed from the image-erasing input information when the input information is image-erasing input information.

13 Claims, 42 Drawing Sheets

(56) References Cited

U.S. PATENT DOCUMENTS

| | | | | |
|---|---|---|---|---|
| 5,539,427 | A | * | 7/1996 | Bricklin ............ G06F 17/30259 345/173 |
| 5,548,705 | A | * | 8/1996 | Moran et al. ................. 715/863 |
| 5,694,532 | A | * | 12/1997 | Carey ................. G06F 3/04842 345/419 |
| 5,712,656 | A | * | 1/1998 | Ikeda ................. G06F 3/04845 345/440 |
| 5,805,725 | A | * | 9/1998 | Sakata ................. G06F 3/0488 345/619 |
| 5,940,082 | A | * | 8/1999 | Brinegar et al. ............. 345/442 |
| 6,332,147 | B1 | * | 12/2001 | Moran ................. G06F 17/30017 707/E17.009 |
| 6,730,862 | B1 | * | 5/2004 | Gasparik ............ G06F 3/04842 178/18.01 |
| 6,842,175 | B1 | * | 1/2005 | Schmalstieg ........... G06F 3/011 345/427 |
| 7,259,752 | B1 | * | 8/2007 | Simmons ..................... 345/173 |
| 8,291,350 | B1 | * | 10/2012 | Park .................... G06F 3/04883 715/705 |
| 2003/0214536 | A1 | * | 11/2003 | Jarrett .................... G06K 9/222 715/831 |
| 2004/0032415 | A1 | * | 2/2004 | Rimas ................. G06F 17/2294 345/619 |
| 2006/0212812 | A1 | * | 9/2006 | Simmons ............ G06F 3/04883 715/203 |
| 2014/0258901 | A1 | * | 9/2014 | Cho .................... G06F 3/04883 715/765 |
| 2014/0351725 | A1 | * | 11/2014 | Kim .................... G06F 3/04883 715/765 |

FOREIGN PATENT DOCUMENTS

| | | |
|---|---|---|
| JP | 11-96387 | 4/1999 |
| JP | 11-143628 | 5/1999 |
| JP | 2000-105671 | 4/2000 |
| JP | 2003-162369 | 6/2003 |
| JP | 3789946 | 4/2006 |
| JP | 4053378 | 12/2007 |
| WO | WO 98/38594 A1 | 9/1998 |

OTHER PUBLICATIONS

Extended European Search Repot dated Aug. 22, 2016 in Patent Application No. 10191662.5.

* cited by examiner

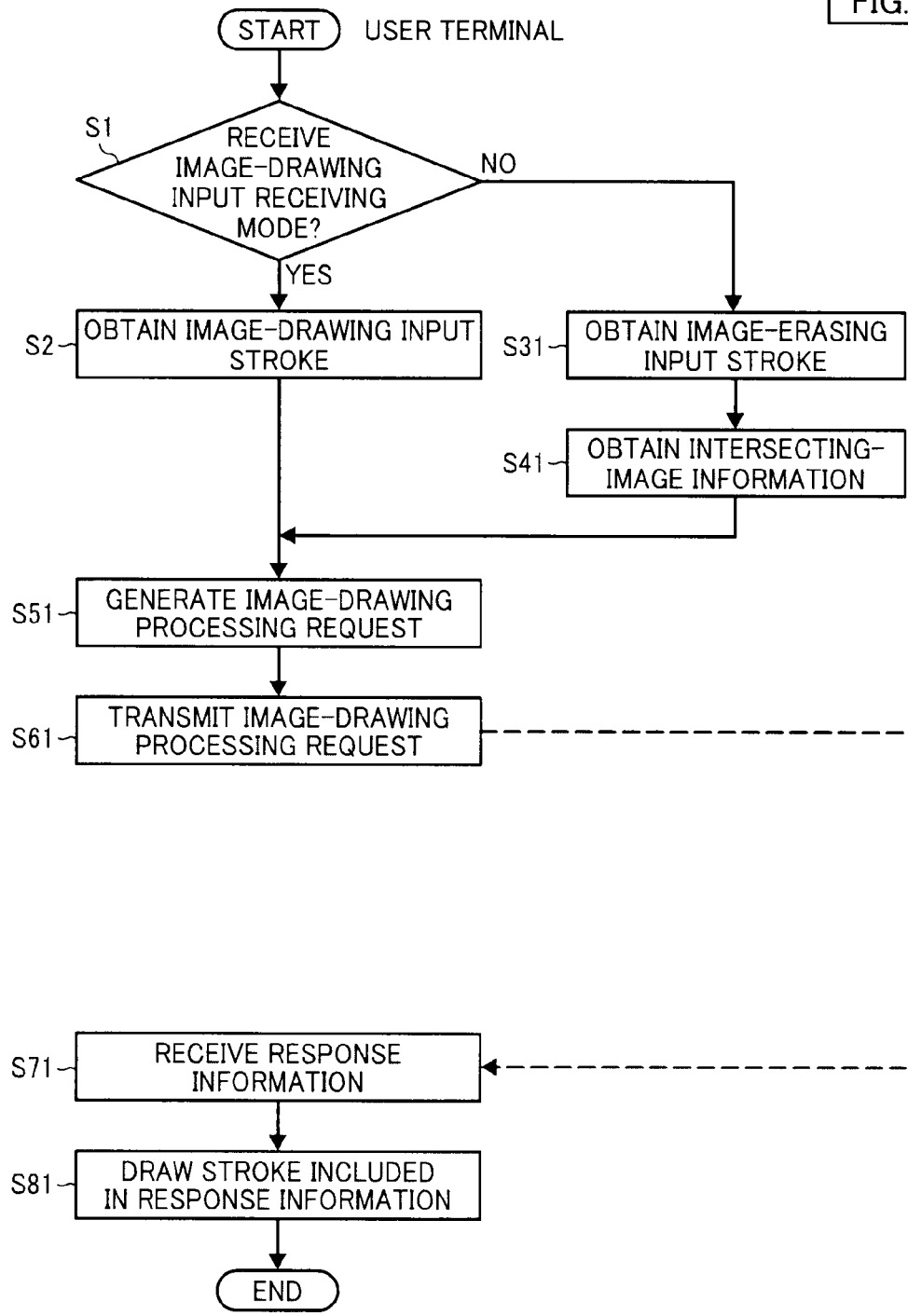

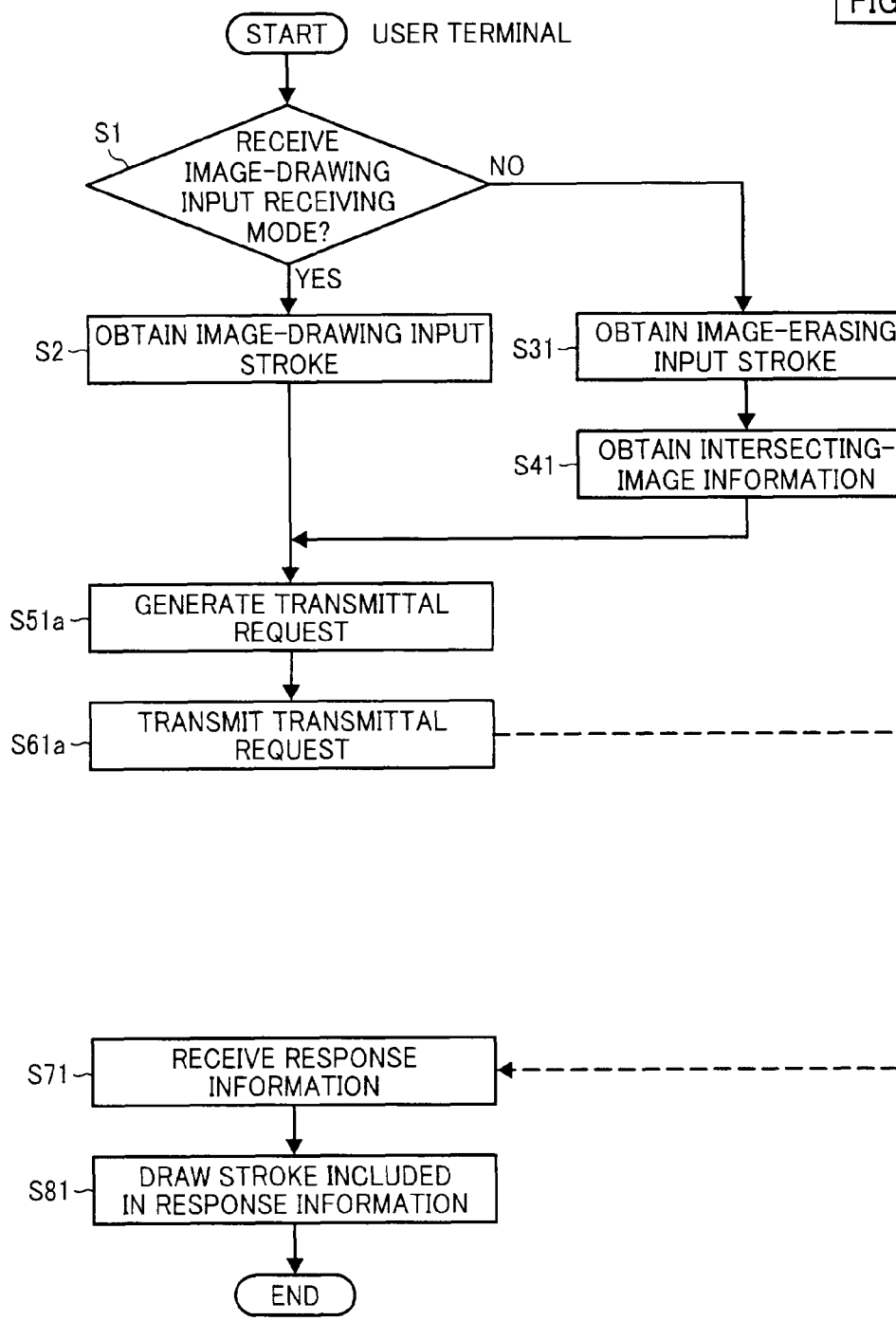

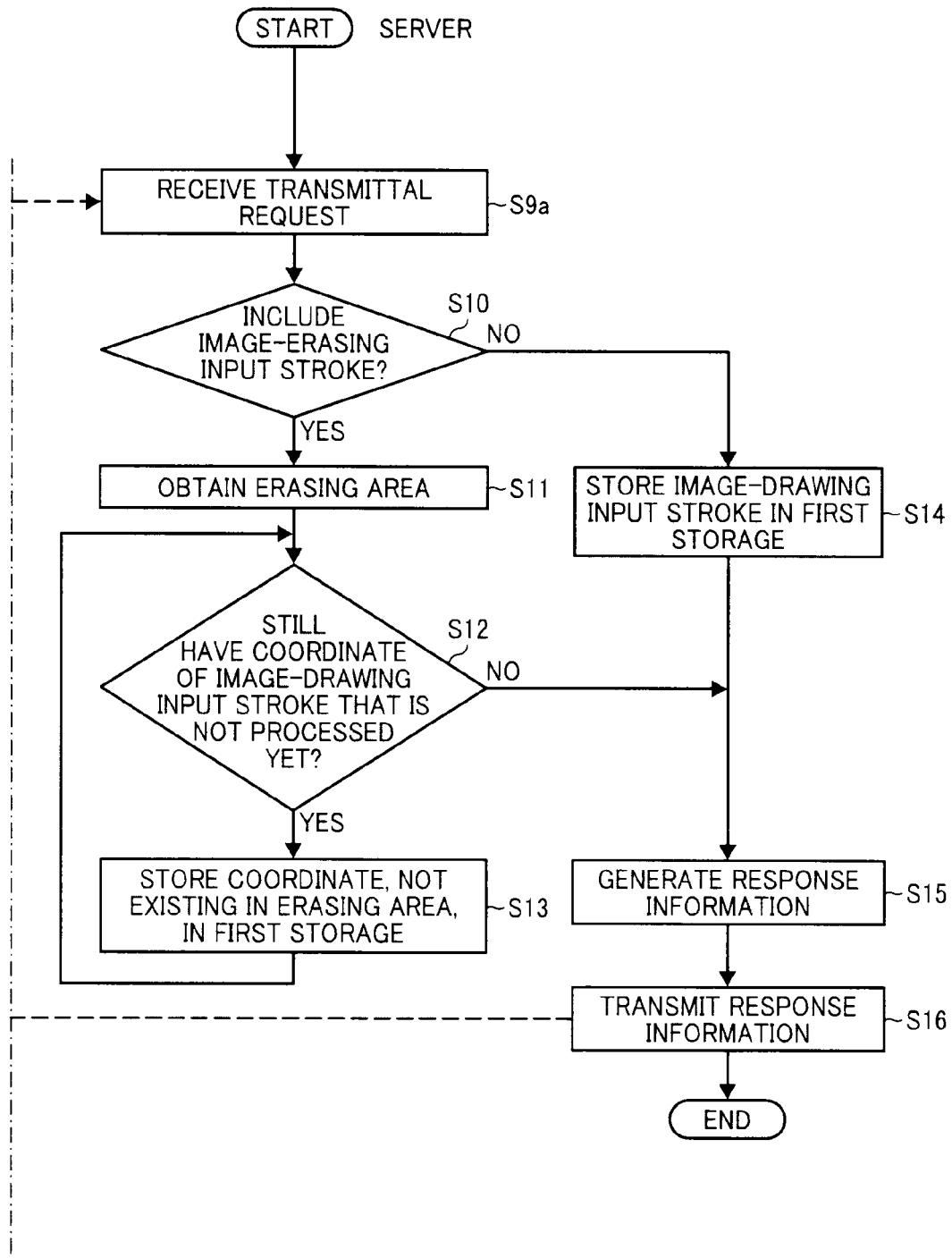

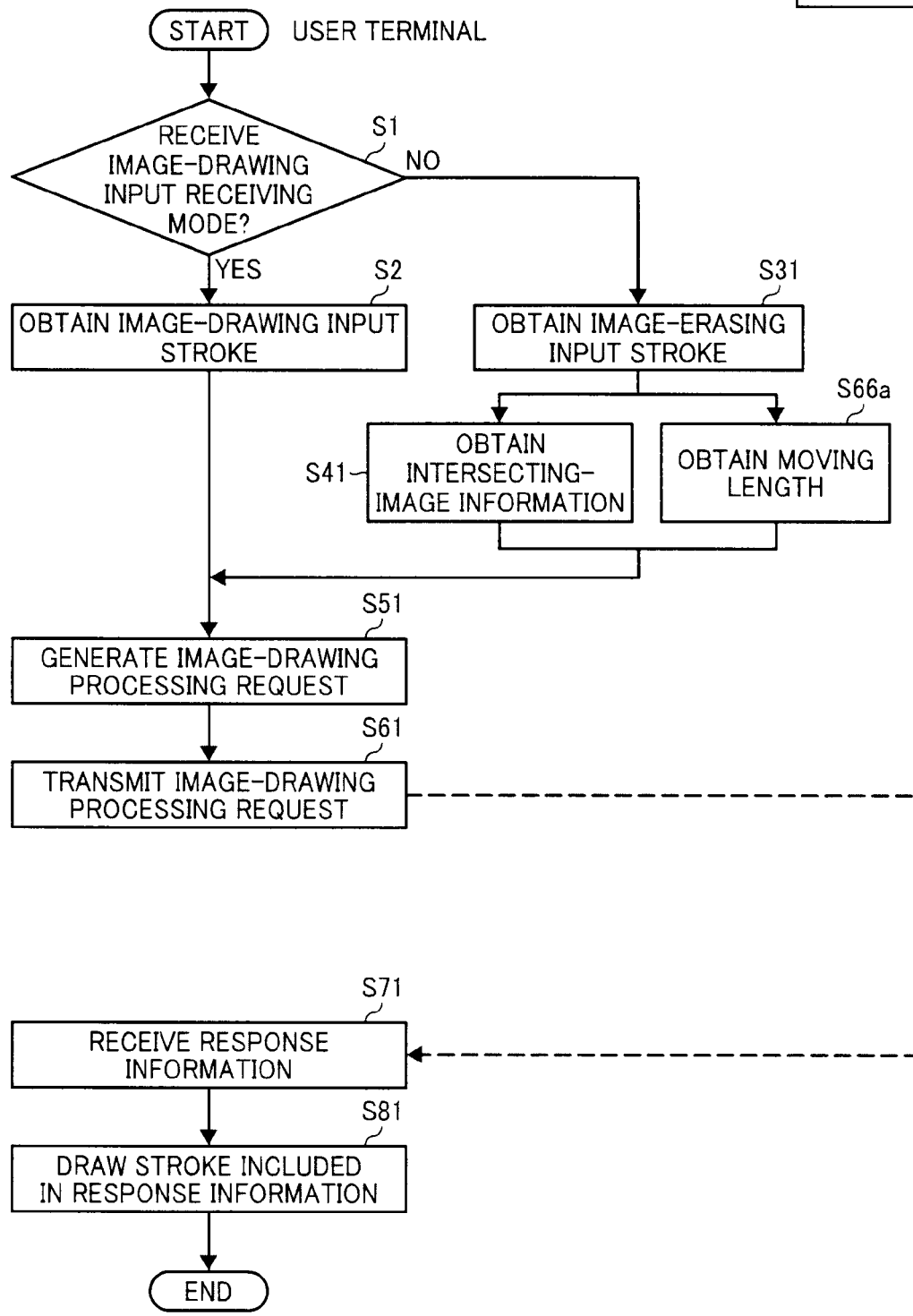

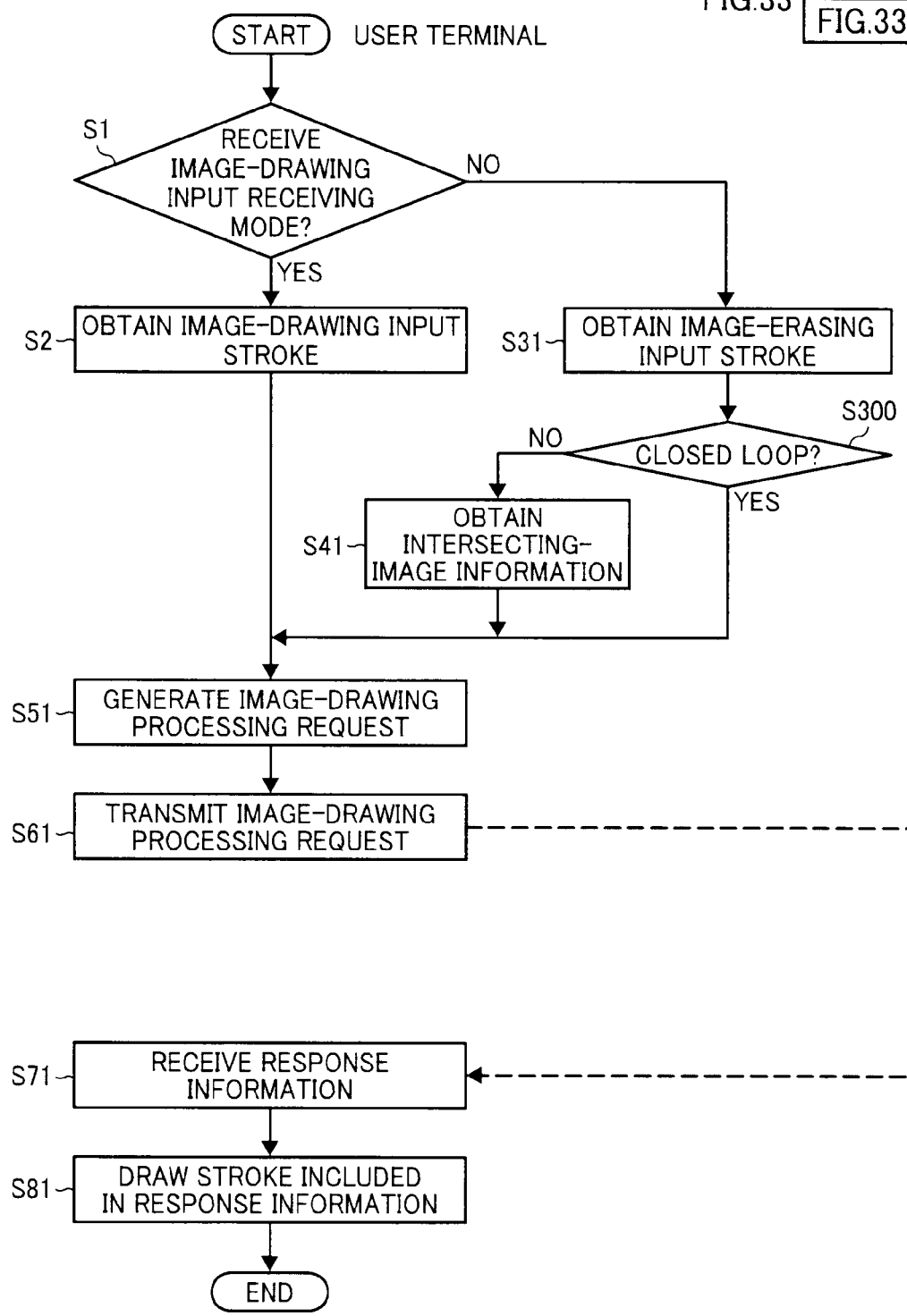

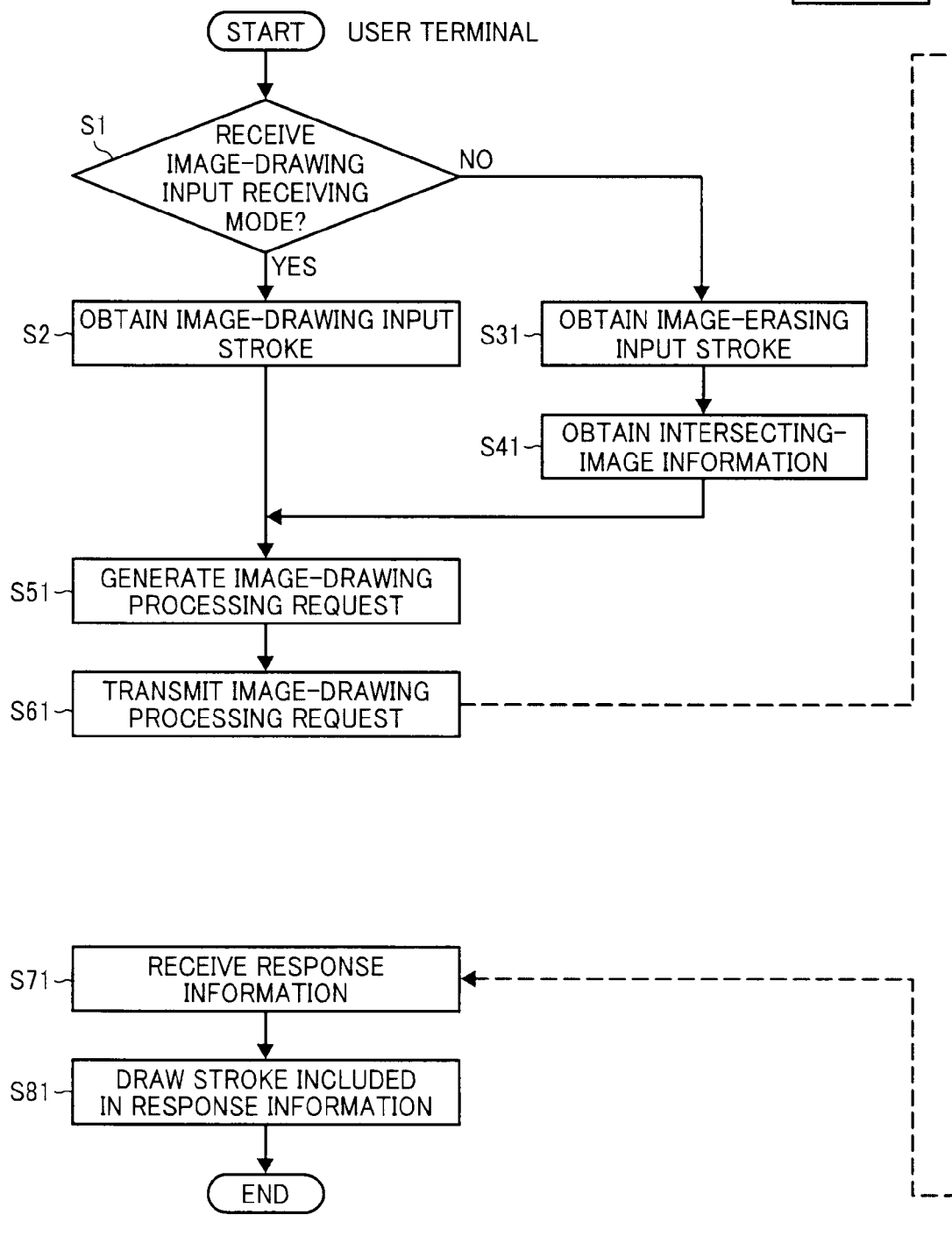

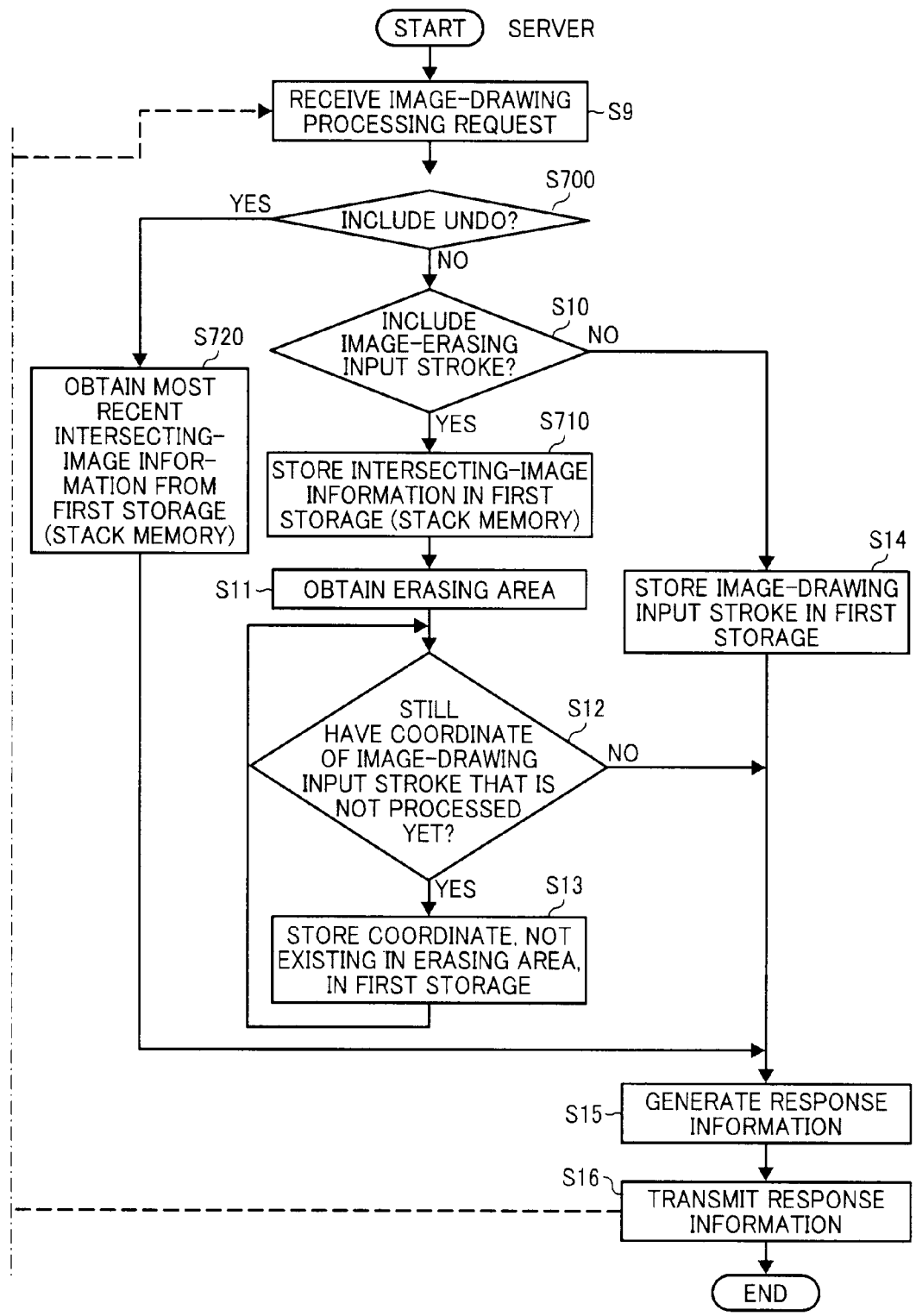

IMAGE-DRAWING PROCESSING SYSTEM, SERVER, USER TERMINAL, IMAGE-DRAWING PROCESSING METHOD, PROGRAM, AND STORAGE MEDIUM

CROSS-REFERENCE TO RELATED APPLICATIONS

This application claims priority to Japanese Patent Application Nos. 2009-265068, filed on Nov. 20, 2009 and 2010-186567, filed on Aug. 23, 2010 in the Japan Patent Office, which are hereby incorporated by reference herein in their entirety.

BACKGROUND OF THE INVENTION

Field of the Invention

The present invention relates to an image-drawing processing system, a server apparatus, a user terminal, an image-drawing processing method, program, and a storage medium.

Description of the Background Art

A plurality of personal computers (PCs) connected via a network can be used as a kind of structured system that can be used to share and edit information or data input at each PC. Such a system may be used, for example, as a conferencing system (e.g., teleconferencing system) to assist knowledge creation such as meetings, communication, exchange of ideas, or the like, and can be used to connect multiple remote locations, as described, for example, in JP-4053378-B.

For example, various objects (text, figures, image, etc.) can be input from each PC using various applications such as a word processor editor, spreadsheet software, image drawing software, teleconference software, or the like. Further, all participants can simultaneously edit objects, input from each PC, on a shared screen.

Administration of the teleconference may be conducted by, for example, a shared administration unit of an administrator PC, activated at first, with such PC referred to as an administrator PC. To display information input from each PC to other PCs simultaneously, the shared administration unit of the administrator PC transmits information input from each PC to shared administration units of other PCs. Further, the administrator PC similarly transmits work results conducted by one PC to shared administration units of other PCs. With such a configuration, users can proceed with the conference while checking work results conducted at each PC on a screen in real time.

As described above, with such a conferencing system, various objects such as text, figures, or the like, can be edited. For example, an information input device and a touch panel can be used to generate, edit, and manipulate handwritten objects, which is input manually, in which the touch panel includes a display to function as a display unit, and an information input/output unit having a coordinate detector to detect a coordinate position in a coordinate detection area indicated by a pointing device such as the tip of a finger, a pen, or the like, also as disclosed in JP-4053378-B.

Further, JP-3789946-B describes a drawing/editing system for drawing/editing figures using object-oriented display, in which a shared drawing system includes a user interface adapted to handwriting operations to provide more natural operation. In such a draw-type system, users can naturally select and edit given objects using a pen on a touch panel.

Further, JP-H11-96387-A discloses a technology that can switch between an edit mode for stroke data and an edit mode for bitmap data, by which handwriting objects can be erased dot by dot and figure objects can be erased object by object by switching between a paint-type system and draw-type system.

However, the above-described technologies have drawbacks. For example, in the system described in JP-4053378-B, handwritten objects are retained as bitmap images, thus increasing a network transfer load. Further, although each object can be manipulated as a whole, an operation to erase one part in one object cannot be conducted.

Further, in the system described in JP-3789946-B, objects that intersect with a handwriting stroke by user can be erased, by which a more natural erasing operation can be conducted, but an operation to erase one part in one object retained in the system cannot be conducted.

Further, in JP-H11-96387-A, if data is stored as a bitmap image in the paint-type system, image quality may deteriorate when the image data is enlarged. Further, an explicit switch between these two modes is required, which degrades operating efficiency.

SUMMARY

In one aspect of the present invention, a user terminal apparatus including an input receiver, an intersecting-image information obtaining unit and a divider is devised. The input receiver receives input information relating to image-drawing and image-erasing. The intersecting-image information obtaining unit obtains image-drawing input information intersecting image-erasing input information as intersecting-image information when the input receiver receives image-erasing input information. The divider divides the intersecting-image information to erase a portion of the intersecting-image information contained in an erasing area computed from the image-erasing input information when the input information is image-erasing input information.

In another aspect of the present invention, an image-drawing processing system is devised. The image-drawing processing system, including one or more user terminals and a server connected each other via a network, in which the server processes information transmitted from each user terminal. Each of the user terminals includes an input receiver to receive input information relating to image-drawing and image-erasing; an intersecting-image information obtaining unit to obtain image-drawing input information intersecting image-erasing input information as intersecting-image information when the input receiver receives image-erasing input information; and a processing request generator to generate an processing request including an image-drawing input received by the input receiver, or an processing request including intersecting-image information and image-erasing input information when the input receiver receives the image-erasing input information. The server includes a processing request receiver to receive the processing request from the user terminal; a response generator to generate response information for the processing request; and a divider to divide the intersecting-image information to erase a portion of the intersecting-image information contained in an erasing area computed from the image-erasing input information when the received processing request includes image-erasing input information.

In another aspect of the present invention, a computer-readable medium storing a program comprising instructions that when executed by a computer cause the computer to execute a method of processing image-drawing is devised. The method includes the steps of: receiving input information relating to image-drawing and image-erasing; obtaining image-drawing input information intersecting image-erasing input information as intersecting-image information when image-erasing input information is received; and dividing the intersecting-image information to erase a portion of the intersecting-image information contained in an erasing area computed from the image-erasing input information when the image-erasing input information is received as input information.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 9A and 9B show a flowchart explaining steps of operation process conducted by a system of sharing information for image drawing of the second example embodiment;

FIGS. 11A and 11B show a flowchart explaining steps of operation process conducted by a system of sharing information for image drawing of the third example embodiment;

FIGS. 31A and 31B show a flowchart explaining steps of operation process conducted by image-drawing processing system of the tenth example embodiment;

FIGS. 33A and 33B show a flowchart explaining steps of operation process conducted by image-drawing processing system of the eleventh example embodiment;

FIGS. 35A and 35B show a flowchart explaining steps of operation process conducted by image-drawing processing system of the twelfth example embodiment;

Figure 1:
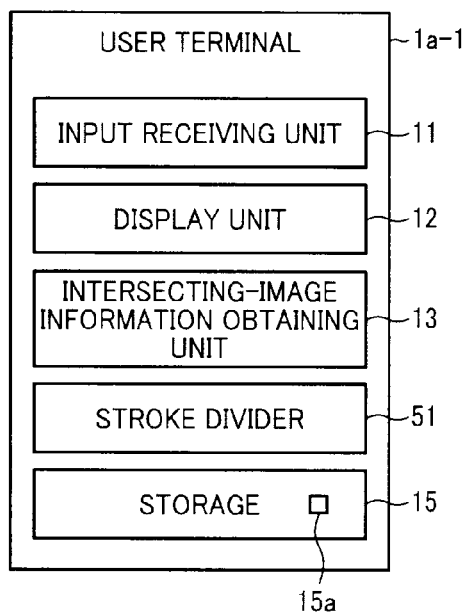
FIG. 1 shows an example overall configuration of user terminal according to a first example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner. Referring now to the drawings, image processing apparatuses or systems for processing image-drawing according to example embodiments are described hereinafter.

First Example Embodiment: User Terminal

[Configuration]

FIG. 1 shows an example configuration of image-drawing processing apparatus according to a first example embodiment, in which a user terminal or user terminal apparatus is used as an image-drawing processing apparatus. A user terminal 1a-1 of FIG. 1 may include an input receiving unit 11, a display unit 12, an intersecting-image information obtaining unit 13, a stroke divider 51, and a storage 15, for example. The input receiving unit 11 receives an input from a user. The display unit 12 displays images. The intersecting-image information obtaining unit 13 obtains intersecting-image information. The stroke divider 51 divides the intersecting-image information such as information or data of image-drawing input stroke into multiple sections, and conducts a given erasing action. As such, the stroke divider 51 may be used as a divider to divide image information, and to erase image information, as required. The storage 15 may include a first storage 15a to store information or data temporarily.

Information (such as input information) received by the input receiving unit 11 may be image-drawing input information and image-erasing input information. Such input information includes information of various objects (text, figures, image, etc.). In the following example cases, a stroke may be input as simple stroke with a pointing device, and such stroke information input may be conducted by a manual or handwriting input, for example. Such input stroke may include at least one or more coordinates, arranged in a given order as coordinate list.

Figure 2:
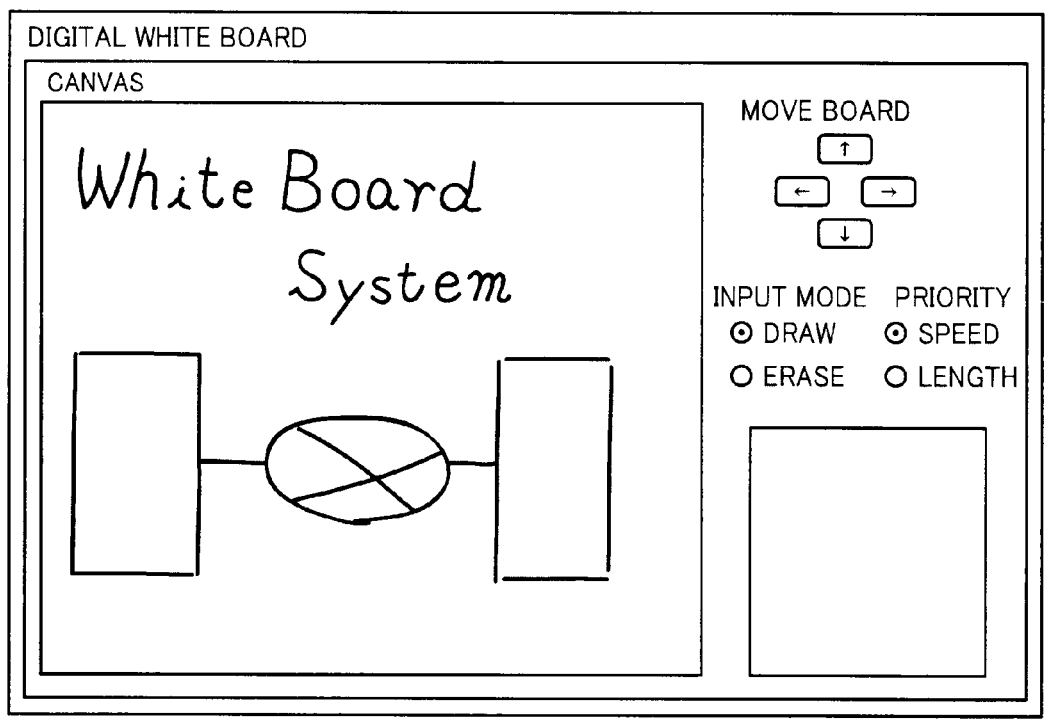
FIG. 2 shows an example screen shot of display unit of user terminal of the first example embodiment.

Switching of image-drawing/image-erasing operation can be conducted, for example, by using a radio button, which can select one item from a plurality of selection items, as shown in FIG. 2, or a specific input device can be used for each of image-drawing and image-erasing operations, in which a pen-type device may be used for image-drawing input, and an eraser-type device may be used for image-erasing input, but not limited thereto.

When a stroke is input by using a pointing device under the image-drawing input receiving mode, the received input information may be referred, for example, to as "image-drawing input stroke," "image-drawing input information," "image-drawing information," or the like, and when a stroke is input by using a pointing device under the image-erasing input receiving mode, the received input information may be referred, for example, to as "image-erasing input stroke," "image-erasing input information" or "image-erasing information," or the like.

Figure 3:
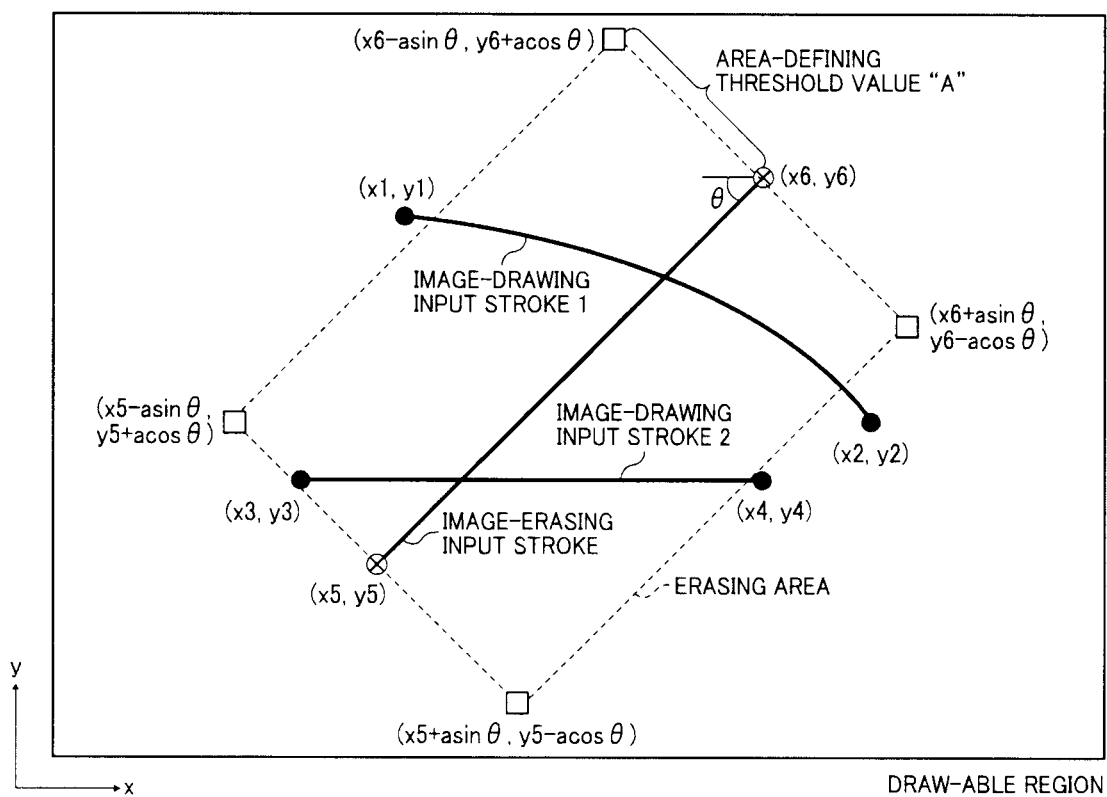
FIG. 3 shows example image-drawing input stroke and image-erasing input stroke input by a input receiving unit of the first example embodiment.

FIG. 3 shows example of the image-drawing input stroke and the image-erasing input stroke, in which an angle of theta $\theta$ is an angle, which is defined by a line connecting two points of the image-erasing input stroke and a line parallel to the x axis. In FIG. 3 or other drawings, a blank circle having a cross mark therein such as (x5, y5) in FIG. 3 indicates one end or one intervening coordinate of an image-erasing input stroke, and a blank square mark such as (x5−a sin $\theta$, y5+a cos $\theta$) indicates a corner end coordinate of an erasing area. Further, a solid circle mark such as (x1, y1) in FIG. 3 indicates one end or one intervening coordinate of an image-drawing input stroke. An erasing area may be set for each given stroke interval of image-erasing input stroke. For example, 10 pixels can be set as stroke interval to set an erasing area. Although a shape of each erasing area may be a square-type shape as shown in FIG. 3, a shape of each erasing area is not limited thereto, but other shapes such as rectangle, circle, ellipse, polygon, or the like can be used as an erasing area, as required.

Further, image-drawing input stroke and image-erasing input stroke can be recognized or expressed using information of coordinates, which may be a combination of coordinates (i.e., coordinate data) such as, (x1,y1), (x2, y2), . . . , and (xn,yn). The image-drawing input stroke and image-erasing input stroke may be also referred to as image-drawing input information and image-erasing input information, respectively.

Intersecting-image information obtained by the intersecting-image information obtaining unit 13, provided for the user terminal 1a-1, includes coordinate data of image-drawing input stroke (e.g., image-drawing input strokes 1 and 2 in FIG. 3) that intersects with an image-erasing input stroke. Further, other than coordinate data such as (x1,y1), (x2,y2), . . . , (xn,yn), intersecting-image information may include information of identifier, color, thickness of line, transparency, types of lines (e.g., dotted line, one-dot dotted line), image generation time, image updating time, and a position coordinate of left top corner of circumscribe rectangle of a concerned object.

The identifier is an identifier to identify each image-drawing input stroke distinctively. For example, in FIG. 3, an identifier of image-drawing input stroke 1 may be set to "ID:1," and an identifier of image-drawing input stroke 2 may be set to "ID:2." The identifier can be expressed by selecting styles, as required.

The "update time" may be a time that when a moving operation of image-drawing input stroke such as image-drawing input, image-erasing input, or the like is conducted.

Instead of the identifier, generation time, updating time, a position coordinate of left top corner of circumscribe rectangle of a concerned object may be used to identify an the image-drawing input stroke, for example.

The storage 15 includes the first storage 15a, which may be a volatile memory, such as random access memory (RAM) or a non-volatile memory such as read only memory (ROM).

[Operation Process]

Figure 4:
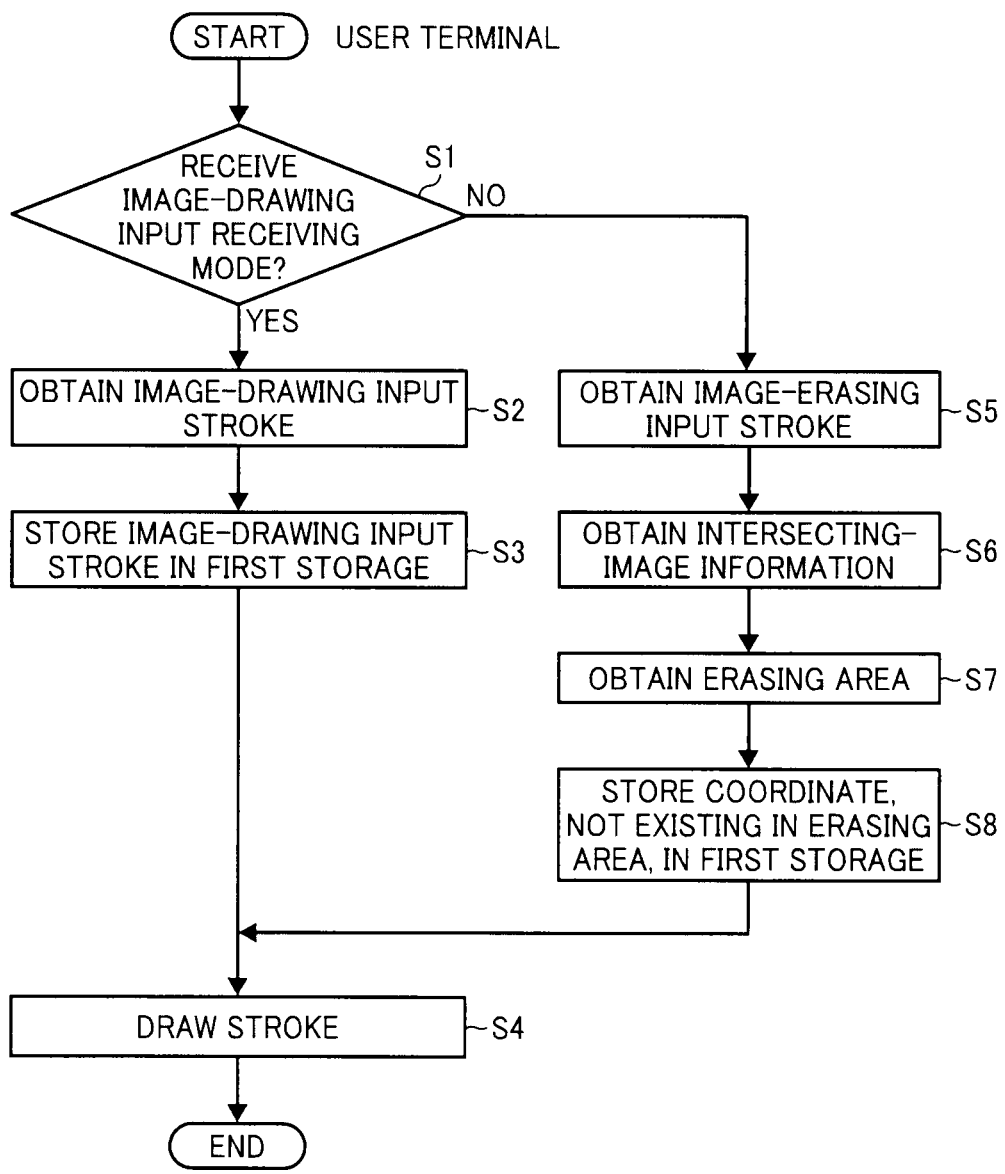
FIG. 4 shows a flowchart explaining steps of operation process conducted by user terminal of the first example embodiment.

FIG. 4 shows a flowchart explaining steps of operation process conducted by the user terminal 1a-1 of the first example embodiment. A user may conduct image-drawing input and/or image-erasing input on an image-drawing screen (see FIG. 2). The input receiving mode can be switched between an image-drawing input mode and image-erasing input mode using, for example, a radio button shown in FIG. 2 or the like, but not limited thereto.

As shown in FIG. 4, when the user terminal 1a-1 receives an input under the image-drawing input receiving mode (step S1: Yes), a stroke input by user is obtained as an image-drawing input stroke (step S2) and stored in the first storage 15a (step S3), and then all strokes stored in the first storage 15a are drawn (step S4).

On one hand, when the user terminal 1a-1 receives an input not under the image-drawing input receiving mode but under the image-erasing input receiving mode (step S1: No), a stroke input by user is obtained as an image-erasing input stroke (step S5), and then intersecting-image information is obtained (step S6).

Hereinafter, the intersecting-image information is explained with reference to FIG. 5. As for the user terminal 1a-1, for example, one image-drawing input information is determined as intersecting-image information whether any one of coordinates of the image-erasing input stroke exists inside a circumscribe rectangle area of one image-drawing input stroke. The circumscribe rectangle area may be specified using points related to the image-drawing input stroke. For example, a circumscribe rectangle area of one image-drawing input stroke can be defined by four corner points and a dotted line as shown in FIG. 5 by.

Figure 5:
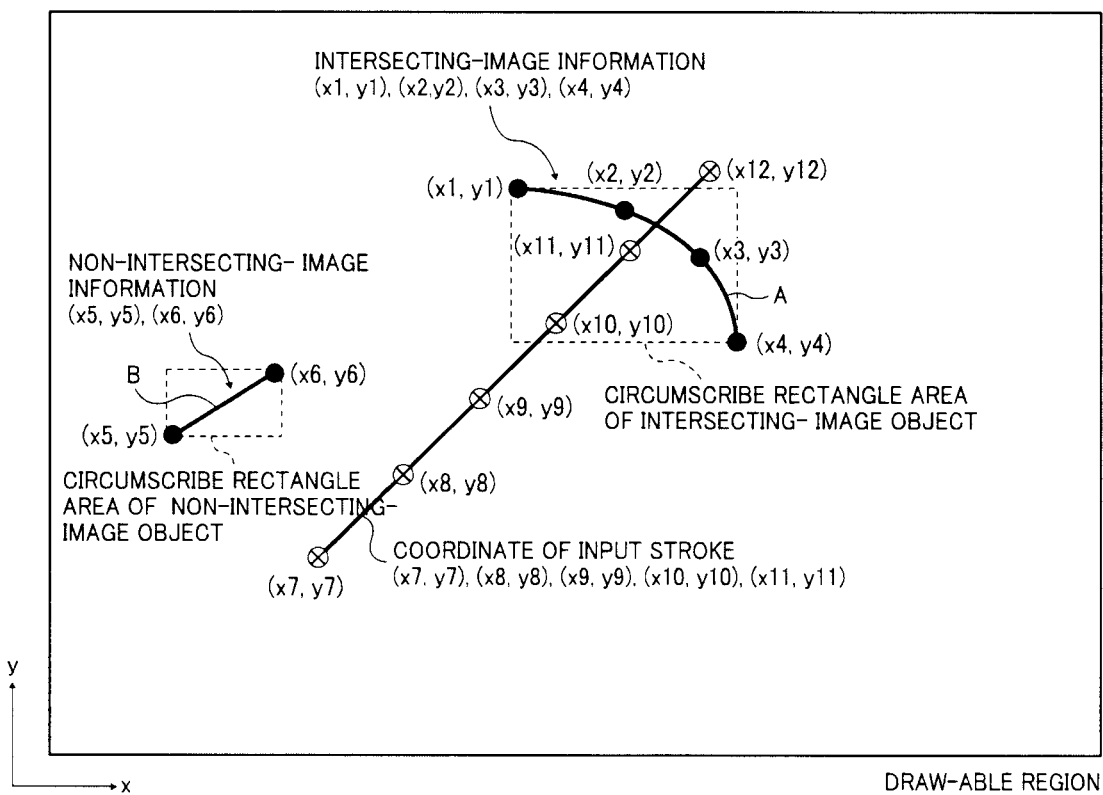
FIG. 5 shows an example condition when obtaining intersecting-image information of the first example embodiment.

In FIG. 5, an image-drawing input stroke A having coordinates (x1,y1), (x2,y2), (x3,y3) and (x4,y4), an image-drawing input stroke B having coordinates (x5,y5) and (x6,y6), and an image-erasing input stroke having coordinates (x7,y7), (x8,y8), (x9,y9), (x10,y10), (x11,y11) and (x12,y12) are drawn, for example. Because coordinates (x10,y10) and (x11,y11) of image-erasing input stroke exist inside a circumscribe rectangle area of image-drawing input stroke A shown by a dotted line, the image-drawing input stroke A is refereed to as a intersecting-image that intersects with the image-erasing input stroke. In FIG. 5, the image-drawing input stroke B is not referred to as a intersecting-image because any one of coordinates of image-erasing input stroke does not exist inside a circumscribe rectangle area of the image-drawing input stroke B shown by a dotted line.

In this disclosure, information of image-drawing input stroke that intersects with image-erasing input stroke information may be referred to as "intersecting-image information" or "intersecting-image."

As shown in FIG. 4, the user terminal 1a-1 obtains an erasing area (see FIG. 3) based on information of image-erasing input stroke (step S7). Such erasing area may be generated or set by setting a given stroke interval for image-erasing input stroke. For example, 10 pixels can be set as stroke interval for image-erasing input stroke. For example, when information of image-erasing input stroke is composed of coordinates (x5,y5) and (x6,y6) as shown in FIG. 3, an erasing are may be set as a rectangle defined by four points specified by following formulas (1), (2), (3), and (4).

(formula 1)

$$(x5-a \sin \theta, y5+a \cos \theta) \quad (1)$$

$$(x5+a \sin \theta, y5-a \cos \theta) \quad (2)$$

$$(x6+a \sin \theta, y6-a \cos \theta) \quad (3)$$

$$(x6-a \sin \theta, y6+a \cos \theta) \quad (4)$$

In which, $\cos \theta=(x6-x5)/r$, $\sin \theta=(y6-y5)/r$, and $r=\sqrt{[(x6-x5)^2+(y6-y5)^2]}$, and, for example, a=10 pixel, are set.

Then, in the user terminal 1a-1, coordinate of intersecting-image information contained in the erasing area is erased from the storage 15 (step S8), and erased from an image displayed on the display unit 12. Further, at step S8, coordinate not contained in the erasing area is stored in the first storage 15. In this disclosure, for the simplicity of expression, the term of coordinate may be used to mean one coordinate or a plurality of coordinates. In this disclosure, "coordinate contained in" or ""coordinate existing in" are used with a similar meaning.

Figure 6:
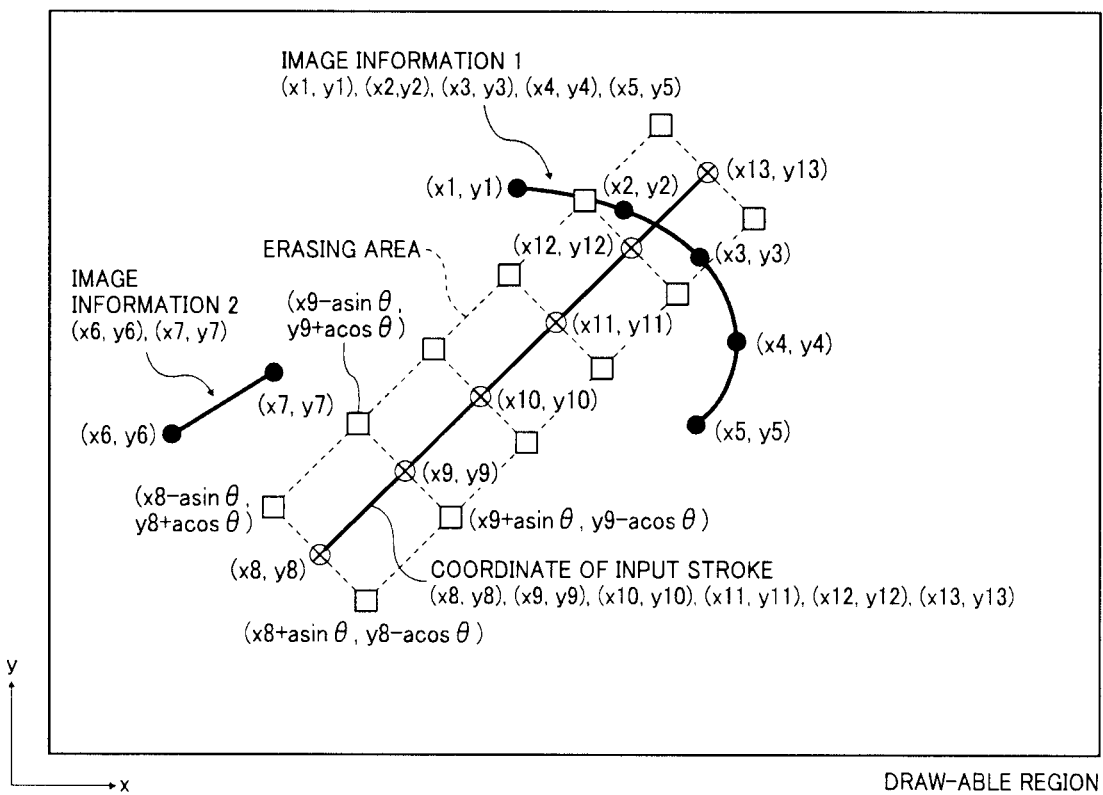
FIG. 6 an example condition before dividing a stroke by a stroke divider of the first example embodiment.
Figure 7:
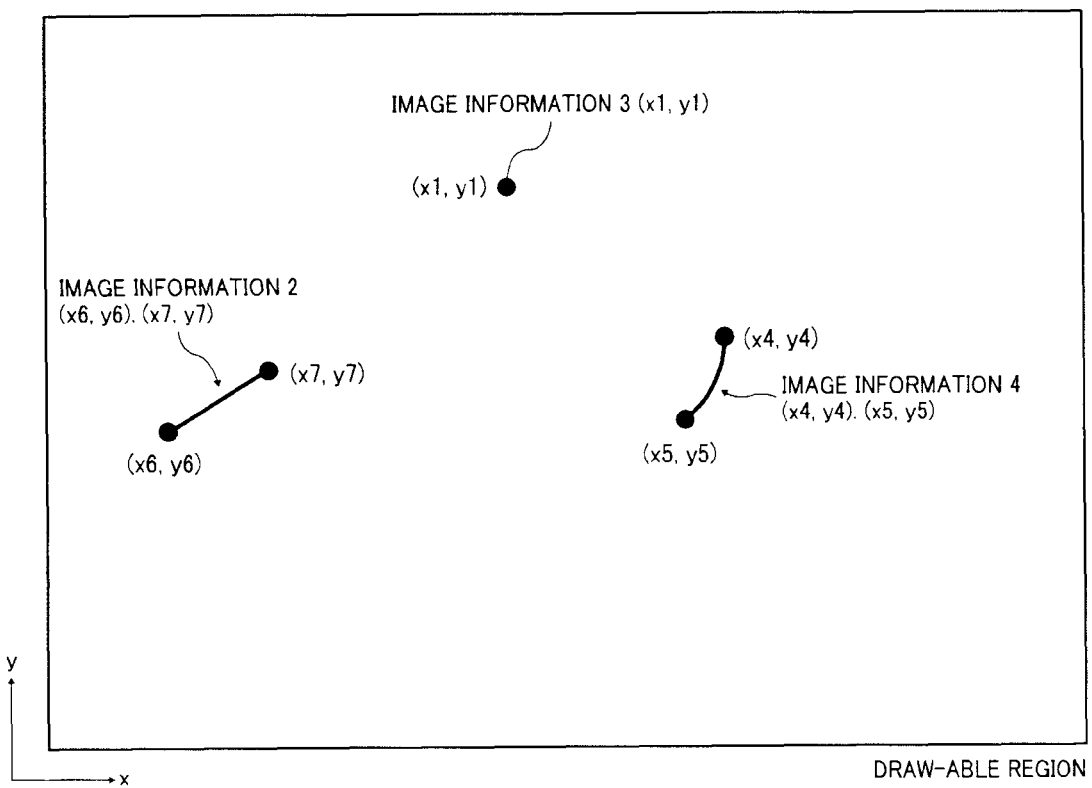
FIG. 7 an example condition after dividing a stroke by a stroke divider of the first example embodiment.

A description of dividing stroke information (or data) using the stroke divider 51 when an image-erasing input stroke is input to an image-drawing processing apparatus is now given in detail with reference to FIGS. 6 and 7. FIG. 6 shows an example condition before dividing an image by the stroke divider 51, and FIG. 7 shows an example condition after dividing an image by the stroke divider 51.

At first, it is assumed that a user inputs a certain input such as input stroke, in which a user may use a mouse as the input receiving unit 11, for example. A user may operate a mouse to input an image-erasing input stroke having coordinates of (x8,y8), (x9,y9), (x10,y10), (x11,y11), (x12,y12), and (x13, y13). Then, the intersecting-image information obtaining unit 13 obtains coordinates of an image-drawing input stroke that intersect with the relevant input image-erasing input stroke, and may store coordinates of the image-drawing input stroke in the storage 15. For example, in FIG. 6, an image-drawing input stroke 1 having coordinates of (x1,y1), (x2,y2), (x3,y3), (x4,y4), and (x5,y5) may be obtained and stored in the storage 15.

Then, the user terminal 1a-1 obtains information of concerned image-erasing input stroke and the coordinates of image-drawing input stroke such as image-drawing input stroke 1 of FIG. 6, intersecting the concerned image-erasing input stroke, from the storage 15 as "intersecting-image information," and computes whether any one of coordinates of image-drawing input stroke exists inside each erasing area (see FIG. 6) using a computing method to be described later. The user terminal 1a-1 erases coordinate contained in the erasing area, and may generate a new stroke using any coordinate not contained in the erasing area, which is composed of at least one coordinate and arranged in a given order as coordinate list such as image information 3 and 4 shown in FIG. 7.

The user terminal 1a-1 generates the new stroke generated by the stroke divider 51 (e.g., image information 3 and 4 of FIG. 7) and an image-drawing input stroke (e.g., image information 2 of FIG. 7) that does not intersect with the intersecting-image information as image drawing stroke, and stores the image drawing stroke in the first storage 15a of the storage 15, and then all image drawing strokes stored in the first storage 15a are drawn (step S4 in FIG. 4).

(Computing by Stroke Divider)

A description is now given to a method of computing by the stroke divider 51 whether each coordinate in intersecting-image information exists inside each erasing area of image-erasing input stroke with reference to FIG. 6.

For example, as for an image-erasing input stroke, an erasing area for two successive coordinate points (x8, y8) and (x9, y9) is defined by following four points, in which cos θ=(x9−x8)/r, sin θ=(y9−y8)/r, r=√[(x9−x8)²+(y9−y8)²], and, for example, a=10 pixel, are set.

(formula 2)

$$(x8-a \sin \theta, y8+a \cos \theta) \quad (6)$$

$$(x8+a \sin \theta, y8-a \cos \theta) \quad (7)$$

$$(x9+a \sin \theta, y9-a \cos \theta) \quad (8)$$

$$(x9-a \sin \theta, y9+a \cos \theta) \quad (9)$$

If any one coordinate (x,y) satisfies the following four formulas, it is determined that the coordinate (x,y) exists inside an erasing area corresponding to two successive coordinate points (x8, y8) and (x9, y9).

$$y \geq -(x-x8)/d + y8 \quad (9)$$

$$y \leq -(x-x9)/d + y9 \quad (10)$$

$$y \geq d(x-(x8+a \sin \theta)) + (y8-a \cos \theta) \quad (11)$$

$$y \leq d(x-(x8-a \sin \theta)) + (y8+a \cos \theta) \quad (12)$$

In the above formulas, d=(y9−y8)/(x9−x8).

The above-described computing is conducted for each two successive coordinates of image-erasing input stroke, for example.

As such, in the first example embodiment, information input by a user (e.g., image data input as a handwriting object by using a pointing device) can be handled as coordinate data in a user terminal, by which while deterioration of image quality can be suppressed and any portion of such input information can be erased (or any portion of image data can be erased), a user's convenience when using an image-drawing processing apparatus can be enhanced. The above-described effect can be attained for the present invention because vector data can be used instead of conventionally used bitmap data.

Second Example Embodiment: Server

[Configuration]

Figure 8:
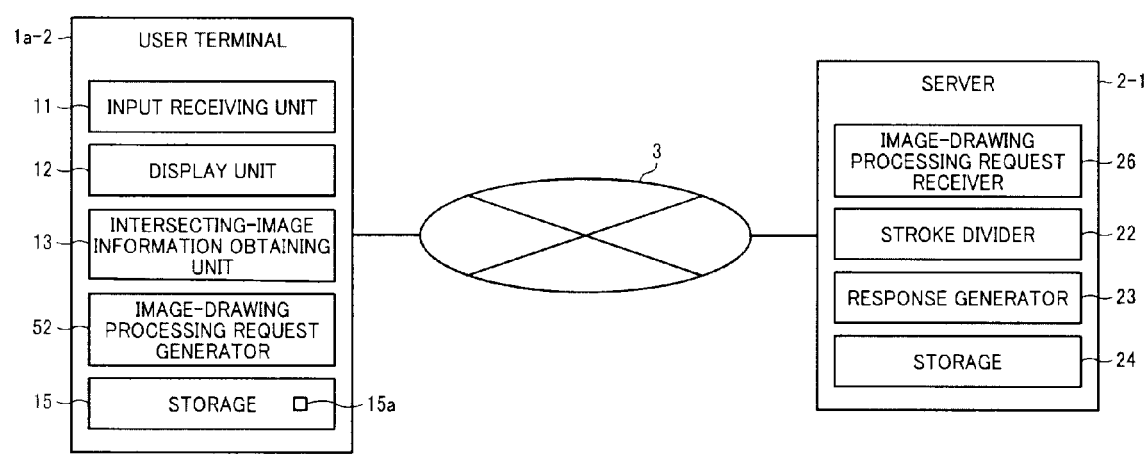
FIG. 8 shows an example overall configuration of system of sharing information for image drawing according to a second example embodiment.

FIG. 8 shows an example overall configuration of image-drawing processing system according to a second example embodiment. The image-drawing processing system of FIG. 8 may include one PC (hereinafter, user terminal 1*a*-2), and a server 2-1 connected each other via a network 3. When compared with the first example embodiment, in the second example embodiment, the user terminal 1*a*-2 may include the input receiving unit 11, the display unit 12, and the intersecting-image information obtaining unit 13 as similar to the first example embodiment, and the server 2-1 may include a stroke divider 22 corresponding to the stroke divider 51 of the first example embodiment. Further, the user terminal 1*a*-2 may also include an image-drawing processing request generator 52 and the storage 15, and the server 2-1 may also include an image-drawing processing request receiver 26, a response generator 23, and a storage 24. In the second example embodiment, a description of same elements shown in the first example embodiment may be omitted.

As such, the user terminal 1*a*-2 includes the input receiving unit 11 to receive an input from a user, the display unit 12 to display image, the intersecting-image information obtaining unit 13 to obtain intersecting-image information, and the image-drawing processing request generator 52. The image-drawing processing request generator 52 may generate an image-drawing processing request including input stroke information and obtained intersecting-image information, for example.

An image-drawing processing request generated by the image-drawing processing request generator 52 provided for the user terminal 1*a*-2 may include input stroke information received currently such as coordinate data of input stroke, and obtained intersecting-image information. Accordingly, the user terminal 1*a*-2 may generate an image-drawing processing request for each input, for each one stroke, or for each mouse action (such as from mouse-down action to mouse-up action), for example. Further, an image-drawing processing request may include identification information of the server 2-1 such as host name or internet protocol address, which may be, for example, uniform resource identifier (URI) such as "somewhere" as described below.

Such image-drawing processing request may be specified by uniform resource identifier (URI), uniform resource locator (URL), or the like. For example, in case of a server having URL of "somewhere" having image drawing field called as "canvas," information may be specified as below.

When an image-drawing input is input as an image-drawing input stroke 1 having (x1,y1) and (x2,y2) as shown in FIG. 3, the following format (13) is specified.

$$\text{http://somewhere/canvas?cmd=draw\&pos=}x1,y1,x2,$$
$$y2 \quad (13)$$

When an image-erasing input is input as an image-erasing input stroke having (x5,y5) and (x6,y6), the following format (14) is specified.

$$\text{http://somewhere/canvas?cmd=erase\&pos1=}x1,y1,x2,$$
$$y2\&\text{pos2}=x3,y3,x4,y4\&\text{pos3}=x5,y5,x6,y6 \quad (14)$$

In FIG. 3, the image-erasing input stroke having (x5,y5) and (x6,y6) intersects with two objects: one object having (x1,y1) to (x2,y2), and another object having (x3,y3) to (x4,y4).

The server 2-1 may include the image-drawing processing request receiver 26, the stroke divider 22, the response generator 23, and the storage 24, for example. The image-drawing processing request receiver 26 receives an image-drawing processing request transmitted from the user terminal 1*a*-2. When an image-drawing processing request includes information of image-erasing input stroke, the stroke divider 22 divides intersecting-image information, which is image-drawing input stroke information, into multiple sections, and conducts a given erasing action. The response generator 23 generates response information for image-drawing processing request. The storage 24 may store stroke information, and identifier of stroke information, for example.

For example, response information generated by the response generator 23 of the server 2-1 may include a plurality of image-drawing input stroke information obtained by dividing the stroke information into multiple sections.

Description style/format of data included in response information for image-drawing processing request may be a structured format such as JSON (Java (registered trademark) Script Object Notation), XML (eXtensible Markup Language), or the like, and may be non-structured format such as text format, but not limited thereto. For example, when JSON format is used, information can be specified as following format (15).

$$[\text{"cmd":"draw","result":[["id":pos1,"pos":[[}x1,y1], [x2,y2]]],[\text{"id":pos2,"pos":[[}x3,y3],[x4,y4]]]]] \quad (15)$$

The user terminal 1a-2 and the server 2-1 can communicate with each other using HTTP (Hyper Text Transfer Protocol), or the like, and response information can be obtained as a HTTP response.

[Operation Process]

Figure 9B:
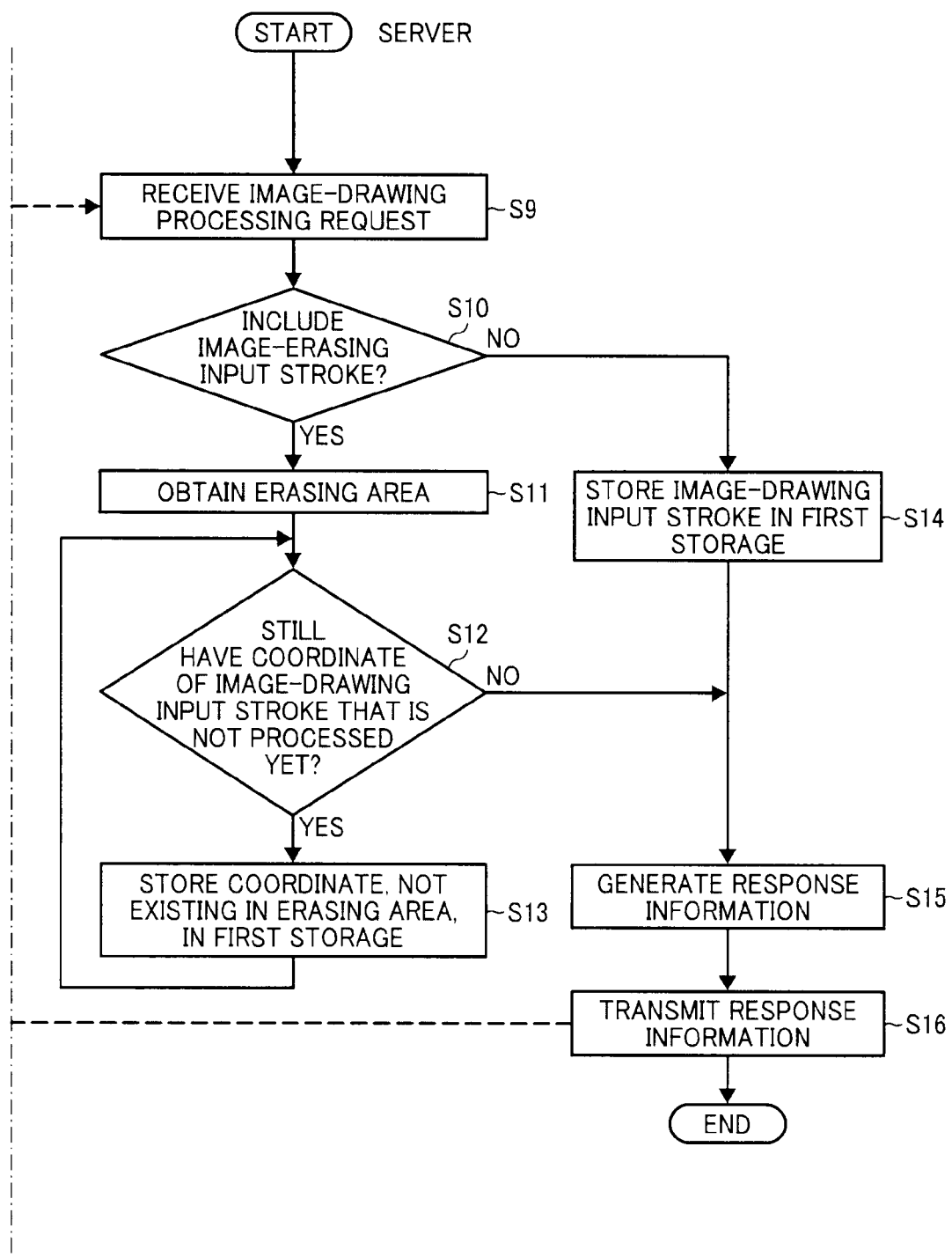

FIGS. 9A and 9B show a flowchart explaining steps of operation process conducted by the image-drawing processing system of the second example embodiment. In the second example embodiment, a description of same elements shown in the first example embodiment may be omitted. A user may conduct image-drawing input and/or image-erasing input on an image-drawing screen (see FIG. 2). The input receiving mode can be switched between the image-drawing input mode and image-erasing input mode using a radio button shown in FIG. 2 or the like, for example, but not limited thereto.

As shown in FIG. 9A, when the user terminal 1a-2 receives an input under the image-drawing input receiving mode (step S1: Yes), a stroke input by user is obtained as an image-drawing input stroke (step S2), and generates an image-drawing processing request (1) including the concerned or related image-drawing input stroke (step S51 in FIG. 9A).

On one hand, when the user terminal 1a-2 receives an input not under the image-drawing input receiving mode but under the image-erasing input receiving mode (step S1: No), a stroke input by user is obtained as an image-erasing input stroke (step S31 in FIG. 9A), and then information of image-drawing input stroke (e.g., coordinate data) that intersects with the concerned image-erasing input stroke is obtained as intersecting-image information (step S41 in FIG. 9A).

Further, the image-drawing processing request generator 52 of the user terminal 1a-2 may generate an image-drawing processing request (2) including the information of image-erasing input stroke and the intersecting-image information (step S51 in FIG. 9A). The user terminal 1a-2 transmits the generated image-drawing processing request to the server 2-1 (step S61 in FIG. 9A).

As above explained, the image-drawing processing request generator 52 generates the image-drawing processing request (1) including information of image-drawing input stroke, or the image-drawing processing request (2) including information of image-erasing input stroke and intersecting-image information, and transmits the image-drawing processing request to an image-drawing processing apparatus such as server 2-1.

Then, the server 2-1 receives the image-drawing processing request (step S9 in FIG. 9B). If the image-drawing processing request does not include the information of image-erasing input stroke, that is if image-drawing processing request (1) is received (step S10: No in FIG. 9B), the image-drawing input stroke information, included in the received image-drawing processing request, is stored in a first storage such as storage 24 (step S14 in FIG. 9B) as it is. Then, the server 2-1 refers to content in the first storage to generate response information (3) (step S15 in FIG. 9B), and transmits the response information (3) to the user terminal 1a-2 (step S16 in FIG. 9B). The first storage storing information may be a volatile memory such as random access memory (RAM) or a non-volatile memory such as read only memory (ROM).

If the server 2-1 receives the image-drawing processing request including the information of image-erasing input stroke, that is if image-drawing processing request (2) is received (step S10: Yes in FIG. 9B), an erasing area is obtained based on the information of concerned image-erasing input stroke (step S11 in FIG. 9B), in which the erasing area can be obtained by conducting similar processes of the first example embodiment.

Then, the server 2-1 determines whether each coordinate of image-drawing input stroke exists in the concerned erasing area (step S12 in FIG. 9B), and stores coordinate, not contained in the erasing area, to the first storage (step S13). In step S12, each coordinate of image-drawing input stroke is determined whether the each coordinate exists in the concerned erasing area, and such determination process continues until all coordinates of image-drawing input stroke is checked.

When the server 2-1 completes the determination process for all coordinates of the image-drawing input stroke (step S12: No in FIG. 9B), the server 2-1 refers to content in the first storage to generate response information (step S15), and transmits the response information to the user terminal 1a-2 (step S16 in FIG. 9B).

As described above, response information generated by the response generator 23 may include a plurality of image-drawing input stroke information obtained by dividing the stroke information into multiple sections.

When the user terminal 1a-2 is input with an image-erasing input stroke, the stroke divider 22 of the server 2-1 divides stroke information as similar to the processes of the first example embodiment.

At first, it is assumed that the user terminal 1a-2 transmits a following image-drawing processing request, in which a user may use a mouse as the input receiving unit 11. For example, a user operates a mouse to input an image-erasing input stroke having coordinates of (x8,y8), (x9,y9), (x10, y10), (x11,y11), (x12,y12), and (x13,y13). Then, the intersecting-image information obtaining unit 13 obtains coordinate of an image-drawing input stroke that intersects with the relevant inputted image-erasing input stroke, and stores the image-drawing input stroke in the storage 15. In FIG. 6, an image-drawing input stroke 1 having (x1,y1), (x2,y2), (x3,y3), (x4,y4), and (x5,y5) is obtained and stored in the storage 15.

Then, the image-drawing processing request generator 52 obtains the information of concerned image-erasing input stroke and the coordinate of image-drawing input stroke (image-drawing input stroke 1 of FIG. 6) intersecting the concerned image-erasing input stroke from the storage 15 as "intersecting-image information," and generates the image-drawing processing request (2) including the information of concerned image-erasing input stroke and the coordinate of image-drawing input stroke intersecting the concerned image-erasing input stroke, and transmits the image-drawing processing request (2) to the server 2-1.

Then, in the server 2-1, which receives the image-drawing processing request (2) transmitted from the user terminal 1a-2, the stroke divider 22 computes whether each coordinate of intersecting-image information included in the image-drawing processing request (2) exists inside each erasing area (see FIG. 6) using the above-described computing method. The server 2-1 erases coordinate contained in the erasing area, and may generate a new stroke using any coordinate not contained in the erasing area, in which the new stroke is composed of at least one coordinate arranged in a given order as coordinate list such as image information 3 and 4 shown in FIG. 7.

Then, the response generator 23 generates response information including the new stroke generated by the stroke divider 22 (e.g., image information 3 and 4 of FIG. 7) and an image-drawing input stroke (e.g., image information 2 of FIG. 7) that does not intersect with the intersecting-image information, and sends back the new stroke information to the user terminal 1*a*-2 (step S71).

As such, in the second example embodiment, information input by a user (e.g., e.g., image data input as a handwriting object by using a pointing device) can be handled or processed as coordinate data, by which while a network load can be reduced and any portion in input information can be erased (or any portion in image data can be erased), a user's convenience when using an image-drawing processing system can be enhanced.

Third Example Embodiment: Image-Drawing Processing System

[Configuration]

Figure 10:
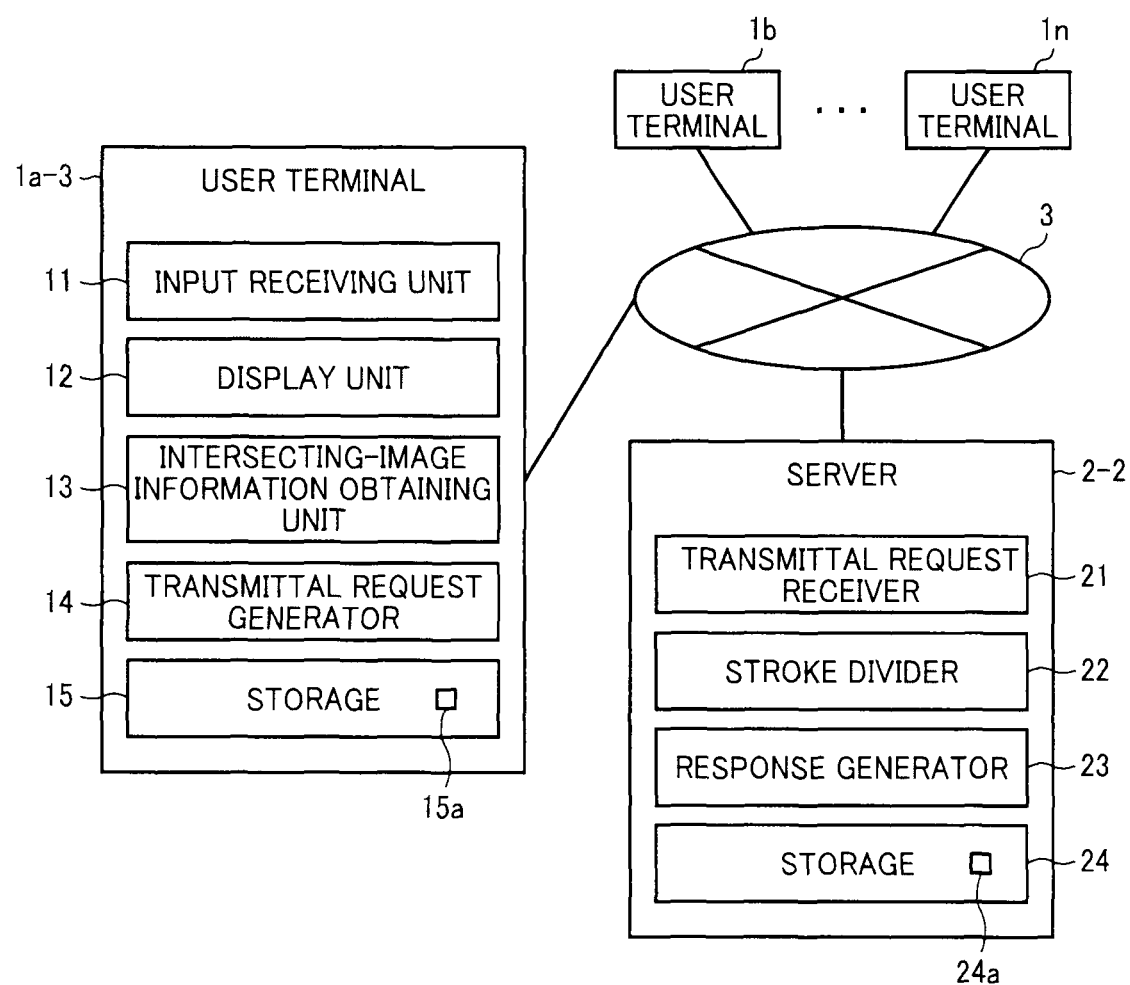
FIG. 10 shows an example overall configuration of image-drawing processing system according to a third example embodiment.

FIG. 10 shows an example overall configuration of image-drawing processing system according to a third example embodiment. The image-drawing processing system of FIG. 10 may include at least one, or two or more PCs (hereinafter, user terminal 1*a*-3, 1*b* to 1*n*), and a server 2-2 connected each other via a network 3. When compared with the second example embodiment, in the third example embodiment, the user terminal 1*a*-3 (and user terminals 1*b* to 1*n*) may include a transmittal request generator 14. In the third example embodiment, a description of same elements shown in the second example embodiment may be omitted.

The user terminals 1*a*-3, and 1*b* to 1*n* have a same configuration, and thereby the user terminal 1*a*-3 is explained hereinafter. The user terminal 1*a*-3 may include the input receiving unit 11, the display unit 12, the intersecting-image information obtaining unit 13, and a transmittal request generator 14. The input receiving unit 11 receives an input from a user, the display unit 12 displays image, and the intersecting-image information obtaining unit 13 obtains intersecting-image information. The transmittal request generator 14 may generate a transmittal request including input stroke information and obtained intersecting-image information, for example.

Transmittal request generated by the transmittal request generator 14 provided for the user terminal 1*a*-3 may include input stroke information received currently (such as coordinate data of input stroke), and obtained intersecting-image information. Accordingly, the user terminal 1*a*-2 generates a transmittal request for each input, for each one stroke, or for each mouse action (such as from mouse-down action to mouse-up action). Further, an image-drawing processing request may include identification information of the server 2-2 such as host name or internet protocol address, which may be set, for example, "somewhere" as URI (uniform resource identifier) as described below.

The transmittal request may be specified by uniform resource identifier (URI), uniform resource locator (URL), or the like. For example, in case of a server having URL of "somewhere" having image drawing field called as "canvas," information may be specified as below.

When an image-drawing input is input as an image-drawing input stroke 1 having (x1,y1) and (x2,y2) as shown in FIG. 3, the following format (16) is specified.

$$\text{http://somewhere/canvas?cmd=draw\&pos=}x1,y1,x2, y2 \quad (16)$$

When an image-erasing input is input as an image-erasing input stroke having (x5,y5) and (x6,y6), the following format (17) is specified.

$$\text{http://somewhere/canvas?cmd=erase\&pos1=}x1,y1,x2, y2\&\text{pos2=}x3,y3,x4,y4\&\text{pos3=}x5,y5,x6,y6 \quad (17)$$

In FIG. 3, the image-erasing input stroke intersects with two objects: one object having (x1,y1) to (x2,y2), and another object having (x3,y3) to (x4,y4).

The server 2-2 may include a transmittal request receiver 21, the stroke divider 22, the response generator 23, and the storage 24, for example. The transmittal request receiver 21 receives a transmittal request transmitted from the user terminal 1*a*-3. When a transmittal request includes information of image-erasing input stroke, the stroke divider 22 divides intersecting-image information, which is image-drawing input stroke information, into multiple sections, and conducts a given erasing action. The response generator 23 generates response information for the transmittal request.

For example, response information generated by the response generator 23 of the server 2-1 may include a plurality of image-drawing input stroke information obtained by dividing the stroke information into multiple sections.

Description style/format of data included in response information for transmittal request may be a structured format such as JSON (Java (registered trademark) Script Object Notation), XML (eXtensible Markup Language), or the like, and may be non-structured format such as text format, but not limited thereto. For example, when JSON format is used, information can be specified as following format (18).

$$[\text{"cmd":"draw","result":}[[\text{"id":pos1,"pos":}[[x1,y1], [x2,y2]]],[\text{"id":pos2,"pos":}[[x3,y3],[x4,y4]]]]] \quad (18)$$

The user terminal 1*a*-3 and the server 2-2 can communicate with each other using HTTP (Hyper Text Transfer Protocol), or the like, and response information can be obtained as a HTTP response for response obtaining connection, in which the user terminal 1*a*-3 and the server 2-2 may use two generated HTTP connection including an input connection for inputting HTTP POST method and a response obtaining connection for conducting polling by HTTP GET method.

The storage 15 may include a first storage, which may be a volatile memory such as random access memory (RAM) or a non-volatile memory such as read only memory (ROM).

[Operation Process]

FIGS. 11A and 11B show a flowchart explaining steps of operation process conducted by the image-drawing processing system of the third example embodiment. In the third example embodiment, a description of same elements shown in the second example embodiment may be omitted. A user may conduct image-drawing input and/or image-erasing input to an image-drawing screen (see FIG. 2). The input receiving mode can be switched between the image-drawing input mode and image-erasing input mode using a radio button shown in FIG. 2 or the like, for example, but not limited thereto.

When the user terminal 1*a*-3 receives an input under the image-drawing input receiving mode (step S1: Yes in FIG. 11A), a stroke input by user is obtained as an image-drawing input stroke (step S2 in FIG. 11A), and generates a transmittal request (1) including the concerned image-drawing input stroke (step S51*a* in FIG. 11A).

On one hand, when the user terminal 1a-3 receives an input not under the image-drawing input receiving mode but under the image-erasing input receiving mode (step S1: No in FIG. 11A), a stroke input by user is obtained as the image-erasing input stroke (step S31 in FIG. 11A), and then information of the image-drawing input stroke (e.g., coordinate data) that intersects with the concerned image-erasing input stroke is obtained as intersecting-image information (step S41 in FIG. 11A).

Then, the transmittal request generator 14 generates a transmittal request (2) including the information of image-erasing input stroke and the intersecting-image information (step S51a in FIG. 11A). The user terminal 1a-3 transmits the generated transmittal requests to the server 2-2 (step S61a in FIG. 11A).

As above explained, the transmittal request generator 14 generates the transmittal request (1) including information of image-drawing input stroke, or the transmittal request (2) including information of image-erasing input stroke and intersecting-image information, and transmits the transmittal request to the server 2-2.

Then, the server 2-2 receives the transmittal request (step S9a in FIG. 11B). If the transmittal request does not include the information of image-erasing input stroke, that is if the transmittal request (1) is received (step S10: No in FIG. 11B), the image-drawing input stroke information, included in the received image-drawing processing request, is stored in a storage 24 or a first storage 24a (step S14 in FIG. 11B) as it is.

Then, the server 2-2 refers to content in the storage 24 or first storage 24a to generate response information (3) (step S15 in FIG. 11B), and transmits the response information (3) to the user terminal 1a-3 (step S16 in FIG. 11B). The storage 24 may include the first storage 24a, which may be a volatile memory such as random access memory (RAM) or a non-volatile memory such as read only memory (ROM).

If the server 2-2 receives the transmittal request including the information of image-erasing input stroke, that is if the transmittal request (2) is received (step S10: Yes in FIG. 11B), an erasing area (see example of FIG. 3) is obtained based on the information of concerned image-erasing input stroke (step S11 in FIG. 11B), in which the erasing area can be obtained by conducting similar processes of the first example embodiment.

Then, the server 2-1 determines whether each coordinate of image-drawing input stroke exists in the concerned erasing area (step S12 in FIG. 11B), and stores coordinate, not contained in the erasing area, to the first storage (step S13 in FIG. 11B). In step S12, each coordinate of image-drawing input stroke is determined whether the each coordinate exists in the concerned erasing area, and such determination continues until all coordinates of image-drawing input stroke is checked.

When the server 2-2 completes the determination for all coordinates of the image-drawing input stroke (step S12: No in FIG. 11B), the server 2-2 refers to content in the first storage to generate response information (step S15), and transmits the response information to the user terminal 1a-2 (step S16). As described above, response information generated by the response generator 23 may include a plurality of image-drawing input stroke information obtained by dividing the stroke information into multiple sections.

When the user terminal 1a-3 is input with an image-erasing input stroke, the stroke divider 22 of the server 2-2 divides stroke information as similar to the processes of the first example embodiment.

Figure 12A:
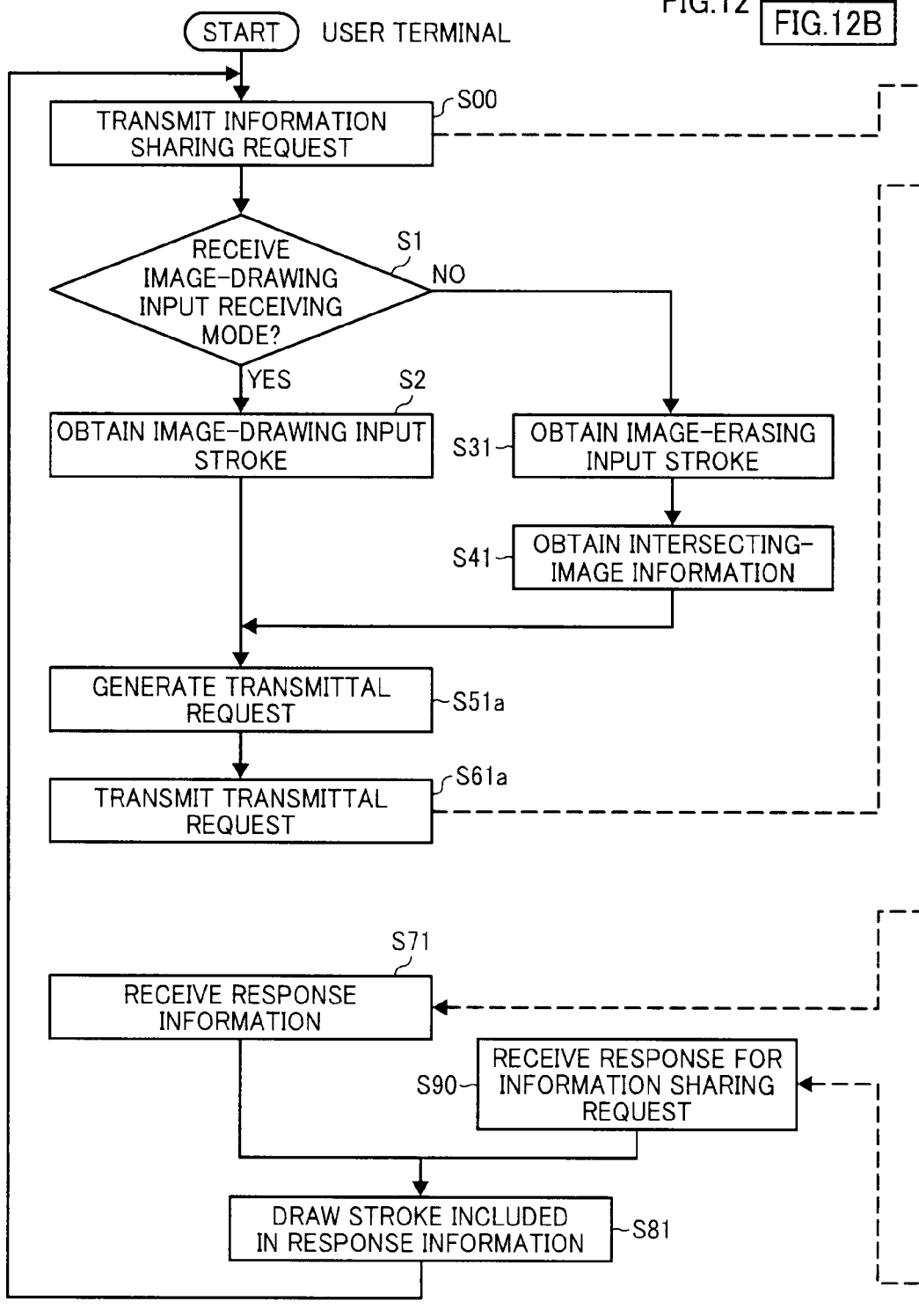
FIGS. 12A and 12B show a flowchart explaining steps of operation process for sharing information of image-drawing input stroke information input by other user terminal.
Figure 12B:
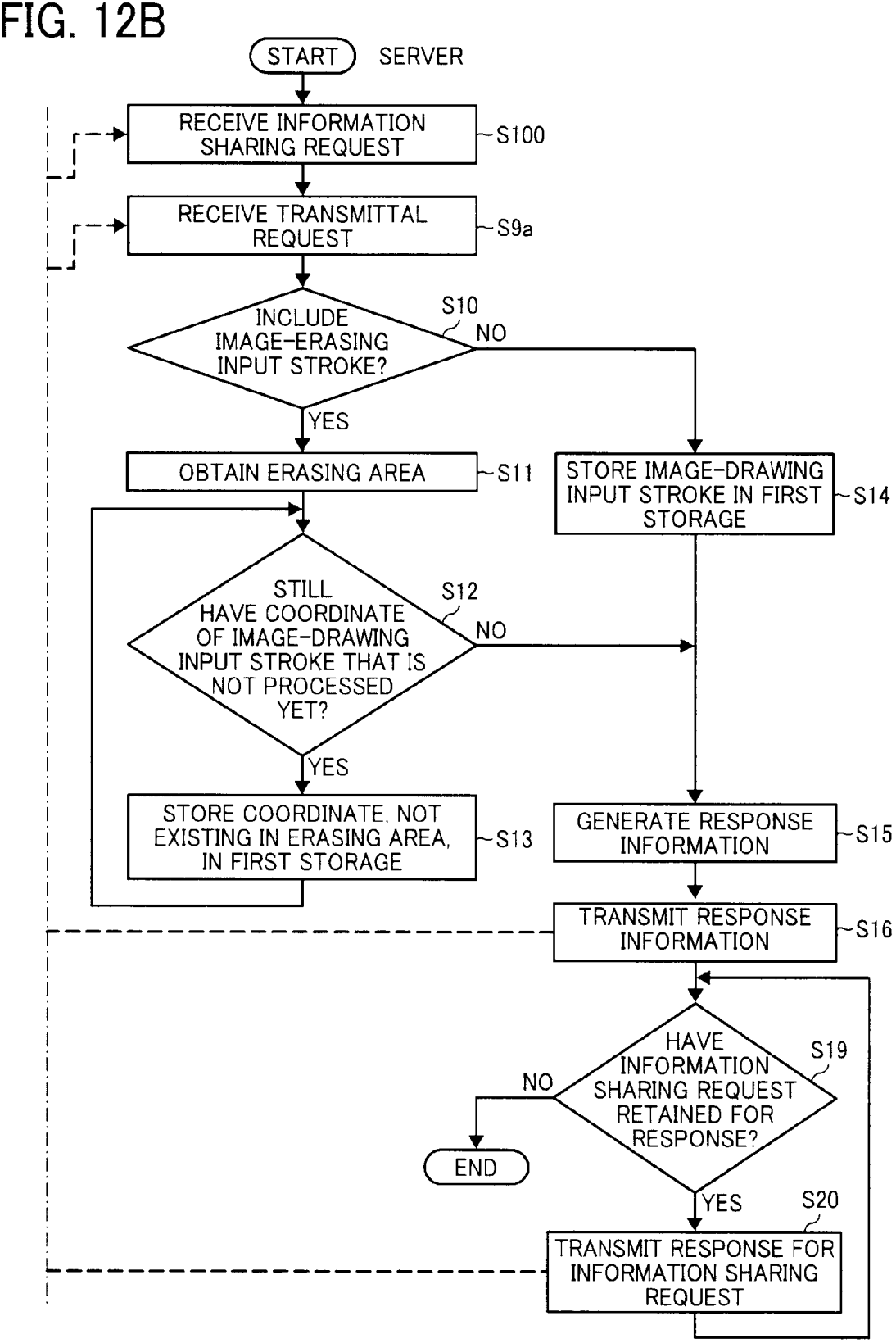

A description is given to information sharing among user terminals with reference to FIGS. 12A and 12B, in which image-drawing input stroke information input from each one of user terminals may be shared by other user terminals. In FIGS. 12A and 12B, same step numbers are attached to same operation processes shown in FIGS. 11A and 11B, and a description of such processes may be omitted.

Information sharing among user terminals can be conducted as below. Before receiving input information (i.e., right after the start), each user terminal such as 1a-3 and 1b to 1n transmits an information sharing request to the server 2-2 (step S00 in FIG. 12A). When the server 2-2 receives the information sharing request (step S100 in FIG. 12B), the server 2-2 withholds to respond to the information sharing request. Then, after transmitting response information from the server 2-2 (step S16 in FIG. 12B), the server 2-2 transmits a response for the information sharing request to each user terminal (steps S19, S20), which is withheld as above mentioned. Further, if no image-drawing input is conducted for the user terminal 1a-3, the user terminal 1a-3 only transmits an information sharing request (S00 in FIG. 12A) and receives a response for the information sharing request (S90), by which image-drawing input such as image-drawing input stroke information can be shared among other user terminals 1b to 1n, and the user terminal 1a-3.

As such, in the third example embodiment, information input by a user (e.g., image data input as a handwriting object by using a pointing device) can be handled or processed as coordinate data, by which while a network load when sharing information can be reduced deterioration of image quality is suppressed and any portion in input information can be erased (or any portion in image data can be erased), a user's convenience when using an image-drawing processing system can be enhanced.

Fourth Example Embodiment: User Terminal for Erasing by Speed

[Configuration]

Figure 13:
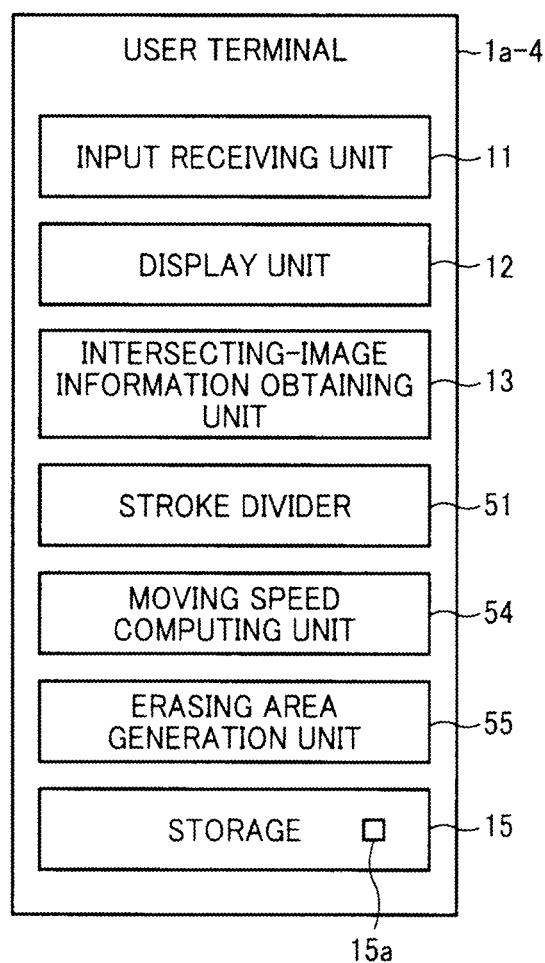
FIG. 13 shows an example overall configuration of user terminal according to a fourth example embodiment.

FIG. 13 shows an example overall configuration of user terminal according to a fourth example embodiment. When compared with the first example embodiment, a user terminal of the fourth example embodiment may include the stroke divider 51, a moving speed computing unit 54, and an erasing-area generation unit 55. The moving speed computing unit 54 computes a moving speed of image-erasing input stroke. The erasing-area generation unit 55 generates an erasing area based on a moving speed of image-erasing input stroke. The stroke divider 51 erases coordinate of image-drawing input stroke contained in a generated erasing area, in which stroke may be divided and erased. In the fourth example embodiment, a description of same elements shown in the first example embodiment may be omitted.

In the fourth example embodiment, because a size of erasing area can be determined based on a moving speed of image-erasing input stroke, many image objects can be erased by just one input operation of image-erasing input stroke. In a conventional configuration, when conducting an erasing work, a user may need to operate a menu to change a width of an eraser step-wisely, but in the present invention, a user may not need to operate such menu, and many image objects can be erased by inputting an image-erasing input stroke with a faster speed.

[Operation Process]

Figure 14:
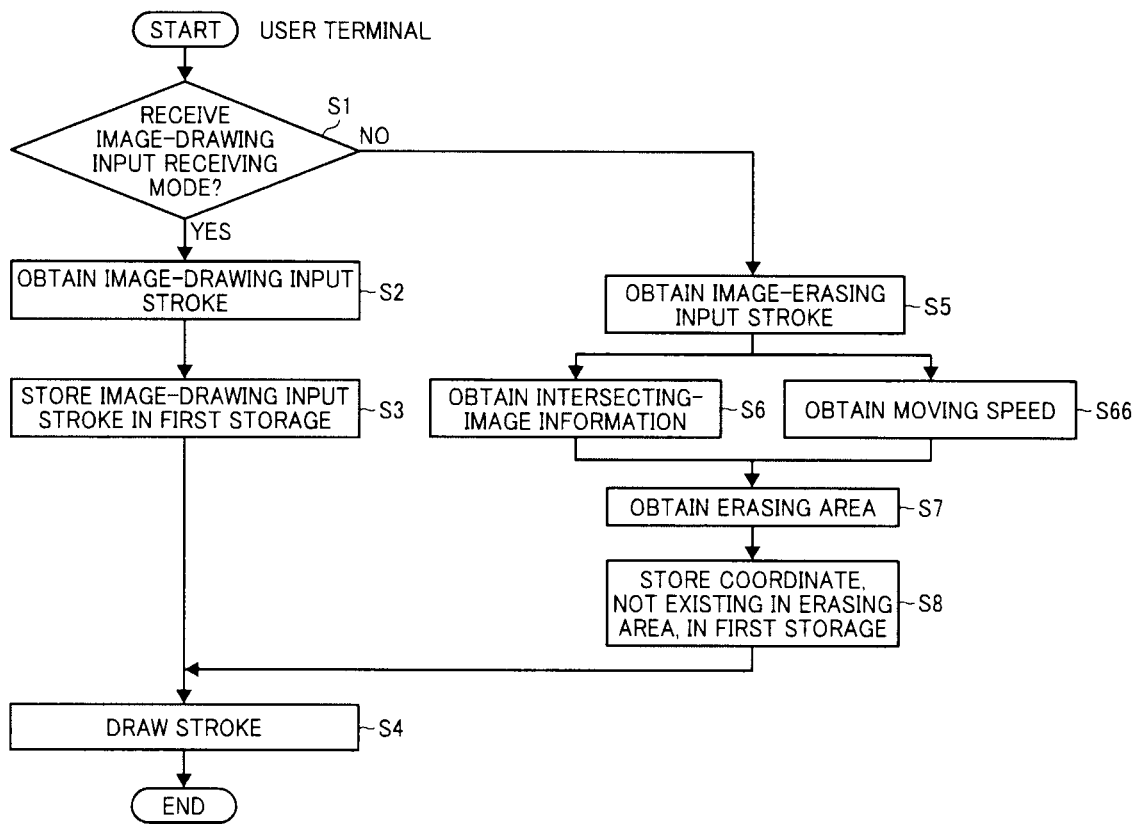
FIG. 14 shows a flowchart explaining steps of operation process conducted by user terminal of the fourth example embodiment.

FIG. 14 shows a flowchart explaining steps of operation process conducted by the image-drawing processing apparatus of the fourth example embodiment. In FIG. 14, same step numbers are attached to same operation processes shown in the first example embodiment, and a description of such processes may be omitted.

In the fourth example embodiment, when the user terminal 1a-1 receives an input not under the image-drawing input receiving mode but under the image-erasing input receiving mode (step S1: No in FIG. 14), the user terminal 1a-4 obtains the received input stroke as image-erasing input stroke (step S5 in FIG. 14).

When the user terminal 1a-4 receives an input of image-erasing input stroke, the intersecting-image information obtaining unit 13 obtains coordinate data of image-drawing input stroke intersecting the concerned image-erasing input stroke as intersecting-image information (step S6 in FIG. 14). Further, the moving speed computing unit 54 computes a moving speed of the concerned image-erasing input stroke based on an elapsing time (for example, measured by seconds) between an input-start time (e.g., mouse-down timing) and an input-end time (e.g., mouse-up timing), and a distance (measured by pixels) of image-erasing input stroke (step S66 in FIG. 14). Then, the erasing-area generation unit 55 obtains an erasing area based on the information of image-erasing input stroke and moving speed (step S7 in FIG. 14).

Figure 15:
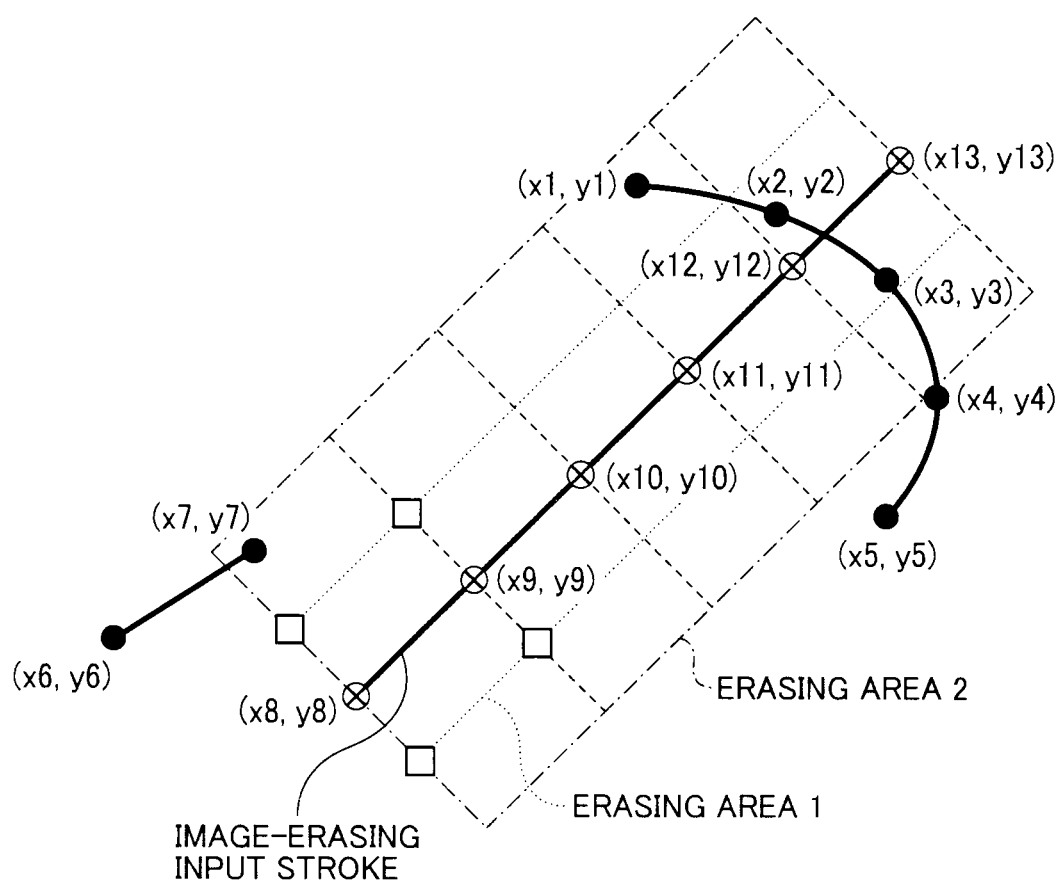
FIG. 15 shows examples of erasing area having different size of the fourth example embodiment.

FIG. 15 shows differences of sizes on erasing area according to the fourth example embodiment. When an erasing area is, for example, a rectangle defined by four corner points, the erasing-area generation unit 55 can determine a size of erasing area based on a moving speed of image-erasing input stroke. For example, FIG. 15 shows an erasing area 1 and an erasing area 2 having differences on size of erasing area, in which a moving speed of image-erasing input stroke for erasing area 2 is faster than a moving speed of image-erasing input stroke for erasing area 1.

In view of a user's convenience for operation, an area-defining threshold value "a" may be set as "a=0.75v[pixel]," in which "v" is an obtained moving speed such as 1000 [pixel/s], and 0.75 is a coefficient to indicate the level of greatness of erasing area in response to a moving speed, and the greater the coefficient, the greater the size of erasing area. The coefficient is not limited to 0.75.

Then, coordinate not contained in an erasing area is stored in the first storage 15a (step S8 in FIG. 14). The subsequent step is similar to FIG. 4, and thereby an explanation may be omitted.

As above explained, in the fourth example embodiment, because an erasing area can be generated based on a moving speed of image-erasing input stroke, switching of erasing area can be conducted seamlessly. Such seamless operation means that an erasing width can be changed automatically from a predetermined erasing width of erasing area set in advance, for example, by a user. Specifically, when a moving speed of image-erasing input stroke is set faster, an erasing width can be increased, and in contrast, when a moving speed of image-erasing input stroke is set slower, an erasing width can be reduced. Further, after conducting an erasing operation, the erasing width of erasing area may return to the predetermined erasing width automatically. With such a configuration, when conducting an erasing work each time, a user may not need to operate a conventional menu to select a size of erasing area, by which an efficient operation can be devised.

Fifth Example Embodiment: Erasing by Length

Figure 16:
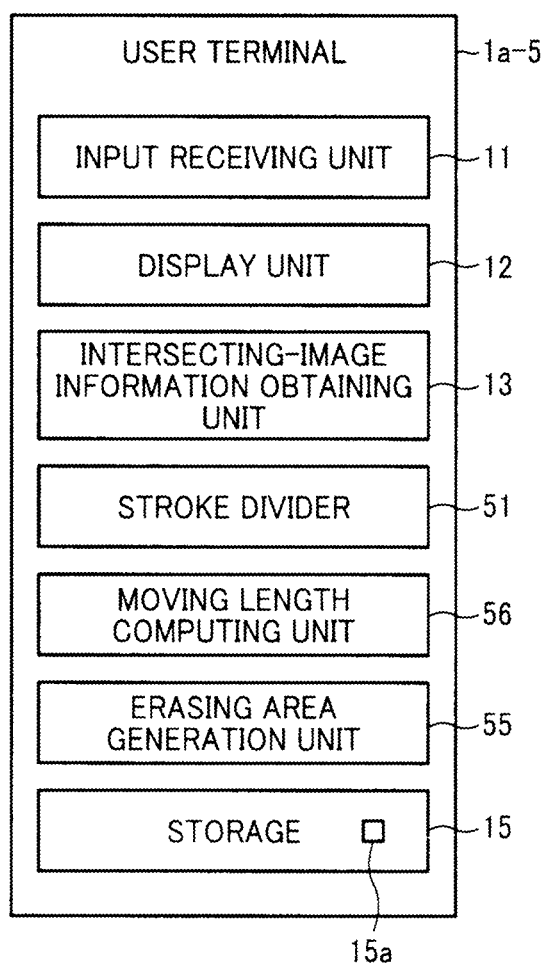
FIG. 16 shows an example overall configuration of user terminal according to a fifth example embodiment.

[Configuration]
FIG. 16 shows an example overall configuration of image-drawing processing apparatus according to a fifth example embodiment. When compared with the fourth example embodiment, a user terminal 1a-5 of the fifth example embodiment may include a moving length computing unit 56, and an erasing area generation unit 55, for example. The moving length computing unit 56 computes a moving length of image-erasing input stroke, and the erasing area generation unit 55 generates an erasing area based on a moving length of image-erasing input stroke. In the fifth example embodiment, a description of same elements shown in the fourth example embodiment may be omitted.

As such, in the fifth example embodiment, because a size of erasing area can be determined based on a moving length of image-erasing input, many image objects can be erased by just one input operation of image-erasing input stroke. With such a configuration, when conducting an erasing work each time, a user may not need to operate a conventional menu to select a size of erasing area step-wisely, and many image objects can be erased by inputting a image-erasing input stroke with a longer moving length.

Figure 17:
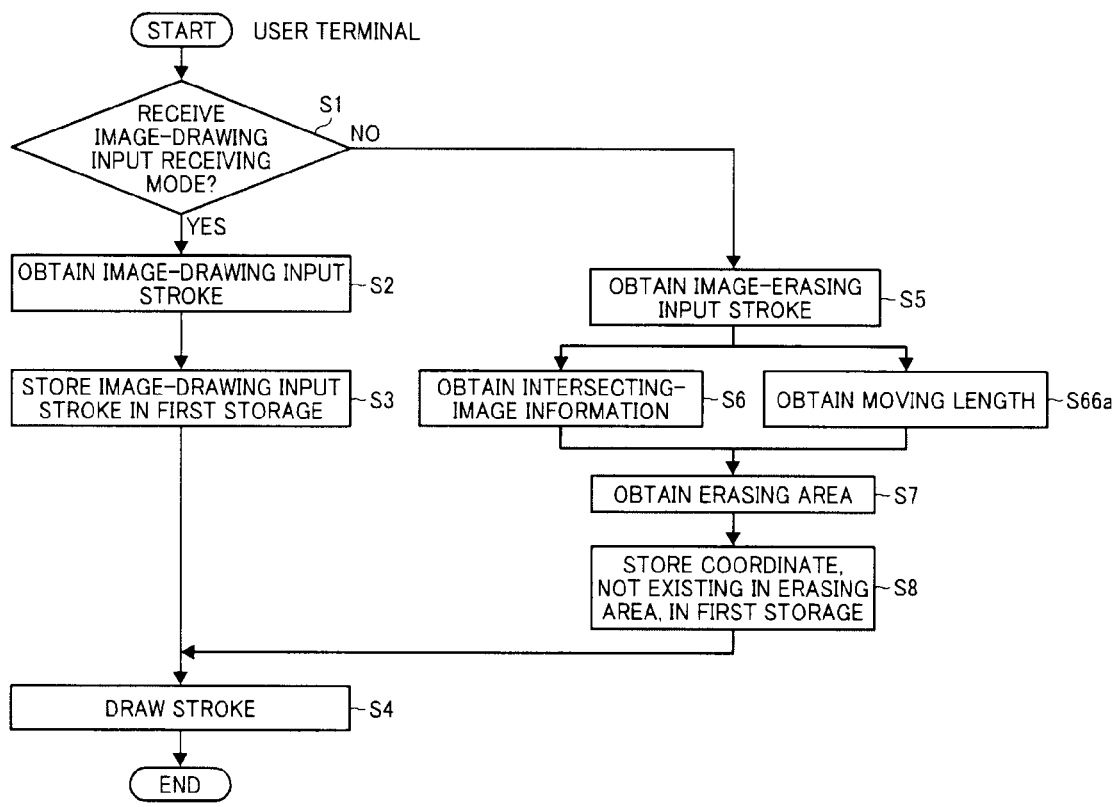
FIG. 17 shows a flowchart explaining steps of operation process conducted by user terminal of the fifth example embodiment.

[Operation Process]
FIG. 17 shows a flowchart explaining steps of operation process conducted by the image-drawing processing apparatus of the fifth example embodiment. In FIG. 17, same step numbers are attached to same operation processes shown in the fourth example embodiment, and a description of such processes may be omitted.

In the fifth example embodiment, the user terminal 1a-5 receives an input of image-erasing input stroke, and the intersecting-image information obtaining unit 13 obtains coordinate data of image-drawing input stroke intersecting the concerned image-erasing input stroke as intersecting-image information (step S6 in FIG. 17). Further, the moving length computing unit 56 computes a moving length of the concerned image-erasing input stroke based on a distance (for example, measured by pixels) of image-erasing input stroke between an input-start time (e.g., mouse-down timing) and an input-end time (e.g., mouse-up timing) (step S66a in FIG. 17). Then, the erasing area generation unit 55 obtains an erasing area based on the information of image-erasing input stroke and moving length (step S7 in FIG. 17).

In view of a user's convenience for operation, an area-defining threshold value "a" may be set as "a=0.75 L[pixel]," in which "L" is an obtained moving length such as 1000 [pixel], and 0.75 is a coefficient to indicate the level of greatness of erasing area in response to a moving length, and the greater the coefficient, the greater the size of erasing area. The coefficient is not limited to 0.75.

Then, coordinate not contained in an erasing area is stored in the first storage 15a of the user terminal 1a-5 (step S8 in FIG. 17). The subsequent step is similar to FIG. 4, and thereby an explanation may be omitted.

As above explained, in the fifth example embodiment, an erasing area can be generated based on a moving length of image-erasing input stroke, by which switching of erasing area can be conducted modelessly. Such modeless operation means that an erasing width can be changed automatically from a predetermined erasing width of erasing area set in advance, for example, by a user. Specifically, when a moving length of image-erasing input stroke is set longer, an erasing width can be increased, and in contrast, when a moving length of image-erasing input stroke is set shorter, an erasing width can be reduced. Further, after conducting an erasing operation, the erasing width of erasing area may return to the predetermined erasing width automatically. With such a configuration, when conducting an erasing work each time, a user may not need to operate a conventional menu to select a size of erasing area, by which an efficient operation can be devised.

Sixth Example Embodiment: Erasing by Shape

Figure 18:
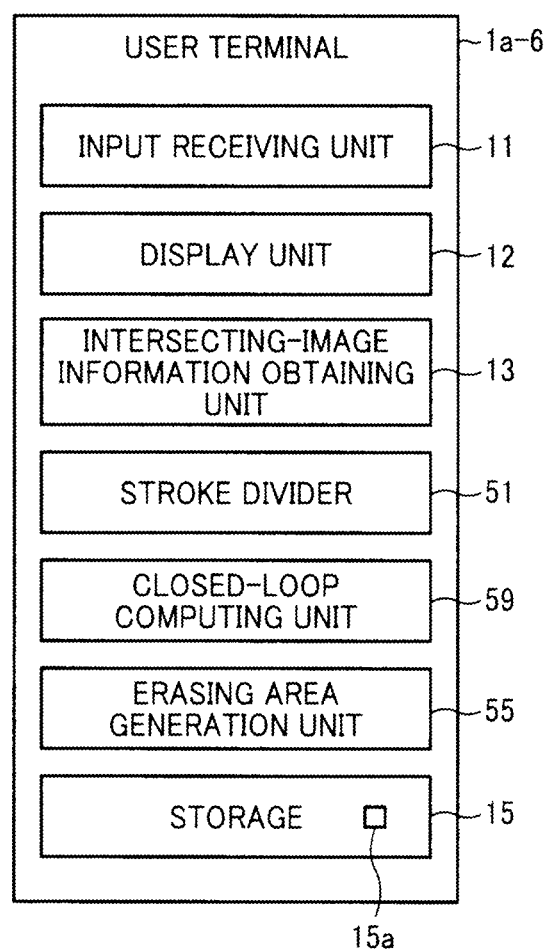
FIG. 18 shows an example overall configuration of user terminal according to a sixth example embodiment.

[Configuration]
FIG. 18 shows an example overall configuration of image-drawing processing system according to a sixth example embodiment. When compared with the fourth and fifth example embodiments, a user terminal 1a-6 of the sixth example embodiment may include a closed-loop computing unit 59 to compute whether an image-erasing input stroke forms a closed loop. When an image-erasing input stroke is a closed loop, and any one of coordinates composing an image-drawing input stroke exists inside the closed loop, the stroke divider 51 may erase all coordinates composing the image-drawing input stroke, by which a whole of the image-drawing input stroke (or a whole object) can be erased. Further, when an image-erasing input stroke is not a closed loop (i.e., partially closed loop), an erasing area is obtained as similar to the above-described embodiments, and coordinate of the image-drawing input stroke contained inside a partially closed loop is erased (referred to as partial erasing method). In the sixth example embodiment, a description of same elements shown in the fourth or fifth example embodiment may be omitted.

Figure 19:
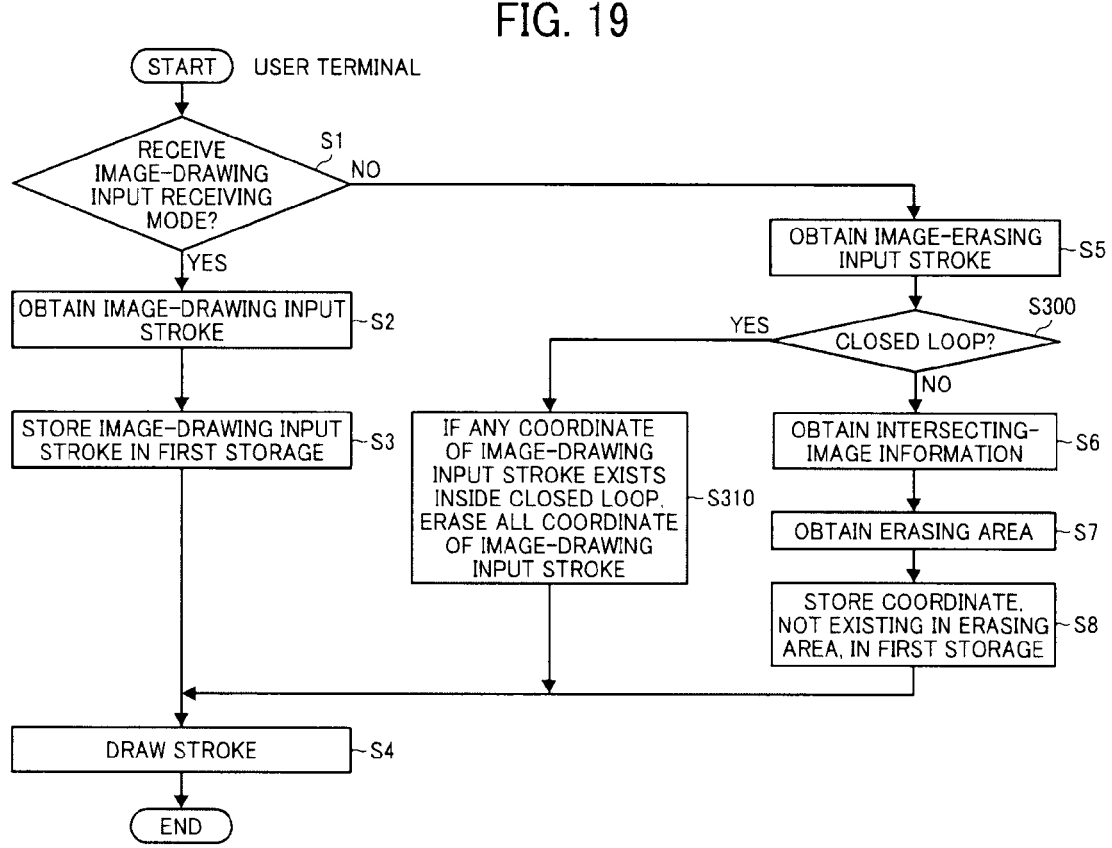
FIG. 19 shows a flowchart explaining steps of operation process conducted by user terminal of the sixth example embodiment.

FIG. 19 shows a flowchart explaining steps of operation process conducted by the image-drawing processing apparatus of the sixth example embodiment. In FIG. 19, same step numbers are attached to same operation processes shown in FIG. 17 as fourth example embodiment, and a description of such processes may be omitted.

In the sixth example embodiment, when the user terminal 1a-6 receives an image-erasing input stroke (step S1: No in FIG. 19), the closed-loop computing unit 59 determines whether the image-erasing input stroke is a closed loop (step S300 in FIG. 19).

When the image-erasing input stroke is a closed loop and any one of coordinates composing an image-drawing input stroke exists inside the closed loop, the user terminal 1a-6 erases all coordinates composing the image-drawing input stroke (step S310 in FIG. 19).

Figure 20:
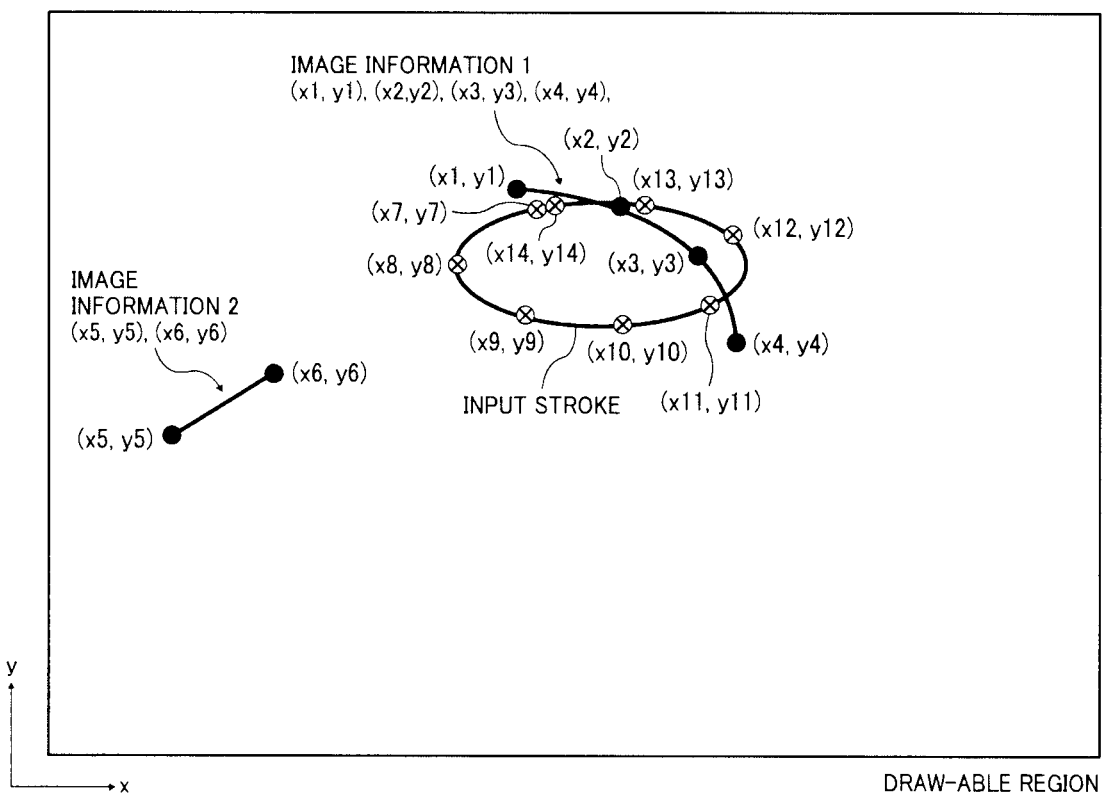
FIG. 20 shows a determination scheme of an image-erasing input stroke as a closed loop by a closed-loop computing unit.

A description is now given to a scheme of determining an image-erasing input stroke as a closed loop by the closed-loop computing unit 59 of user terminal 1a-6 with reference to FIG. 20. The closed-loop computing unit 59 may determine an image-erasing input stroke as a closed loop as below, for example. In case of FIG. 20, an image information having coordinates of (x1,y1), (x2,y2), (x3,y3) and (x4,y4), and an image information 2 having coordinates of (x5,y5) and (x6,y6) are input, and an image-erasing input stroke having coordinates of (x7,y7), (x8,y8), (x9,y9), (x10,y10), (x11,y11), (x12,y12), (x13,y13), and (x14,y14) is input. When such an image-erasing input stroke is input, coordinate (x7,y7) is a coordinate input at an input-start time (e.g., mouse-down timing), a coordinate (x14,y14) is a coordinate input at an input-end time (e.g., mouse-up timing), and intervening coordinates (x8,y8), (x9,y9), (x10,y10), (x11,y11), (x12,y12), and (x13,y13) are input between the input-start time and input-end time. A loop line having such coordinates is determined as a closed loop when the following conditions (19) and (20) are both satisfied, and determined as a non-closed loop when any one of the following conditions (19) and (20) is not satisfied.

(formula 3)

$$\sqrt{[xmax-xmin]^2+(ymax-ymin)^2}>Ft \quad (19)$$

xmax: maximum value of x7, x8, x9, x10, x11, x12, x13, x14
xmin: minimum value of x7, x8, x9, x10, x11, x12, x13, x14
ymax: maximum value of y7, y8, y9, y10, y11, y12, y13, y14
ymin: minimum value of y7, y8, y9, y10, y11, y12, y13, y14
Ft=50 pixel $$\sqrt{[x14-x7]^2+(y14-y7)^2}<Lt \quad (20)$$

(threshold value of closed loop: Lt=20 pixel)

Figure 21:
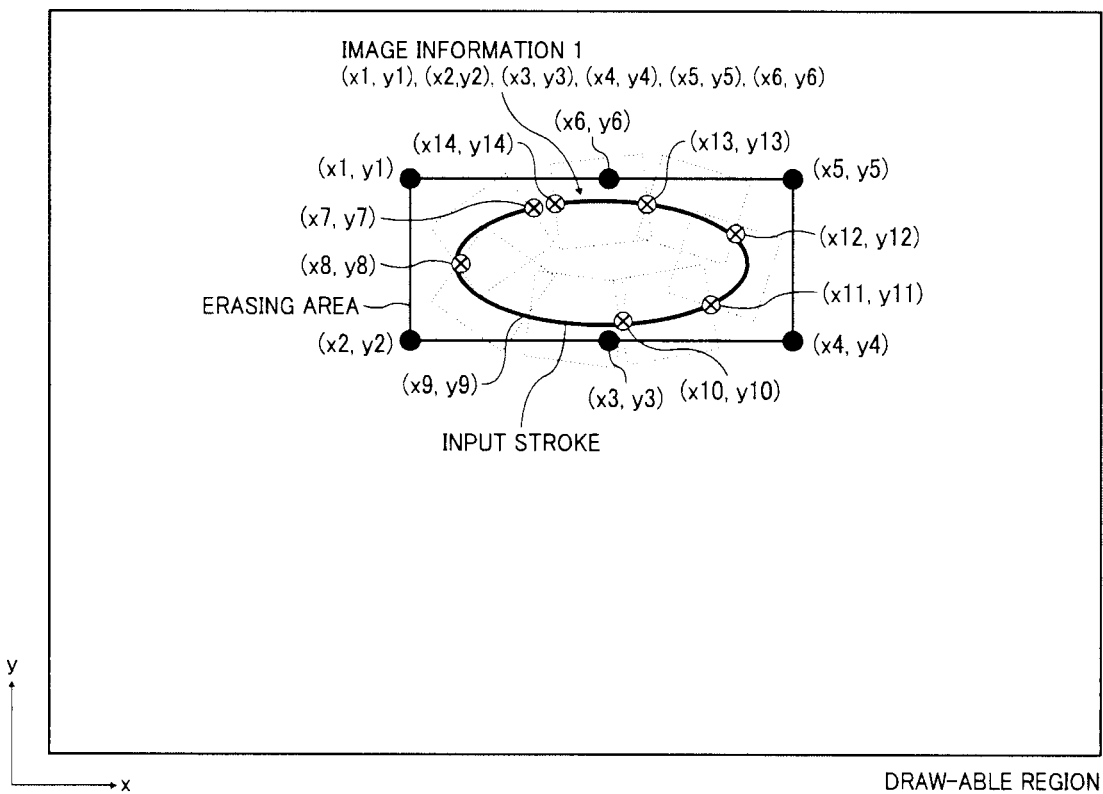
FIG. 21 shows another determination scheme of erasing area of an image-erasing input stroke used as a closed loop.

In the sixth example embodiment, when an image-erasing input stroke is a closed loop and any one of coordinates composing an image-drawing input stroke exists inside the closed loop, the stroke divider 51 erases all coordinates composing the image-drawing input stroke. Further, as shown in FIG. 21, when any one of coordinates composing an image-drawing input stroke exists in an erasing area specified by a closed loop, the stroke divider 51 can erase coordinate composing image-drawing input stroke, in which a part or whole of image-drawing stroke existing outside of a closed loop can be erased, by which a user's convenience can be further enhanced.

As above explained, in the sixth example embodiment, by determining whether stroke information is a closed loop, partial erasing of object and entire erasing of object can be switched modelessly. With such a configuration, when conducting an erasing work each time, a user may not need to operate a conventional menu to select partial erasing of object and entire erasing of object, by which an efficient operation can be devised.

Seventh Example Embodiment: Coloring of to-be-Erased Portion

[Configuration]

When compared to the first example embodiment, in the seventh example embodiment, a to-be-erased portion of coordinate of intersecting-image information may be displayed differently from an image-drawing input stroke and image-erasing input stroke by setting, for example, different color. In the seventh example embodiment, a description of same elements shown in the first example embodiment may be omitted.

Figure 22:
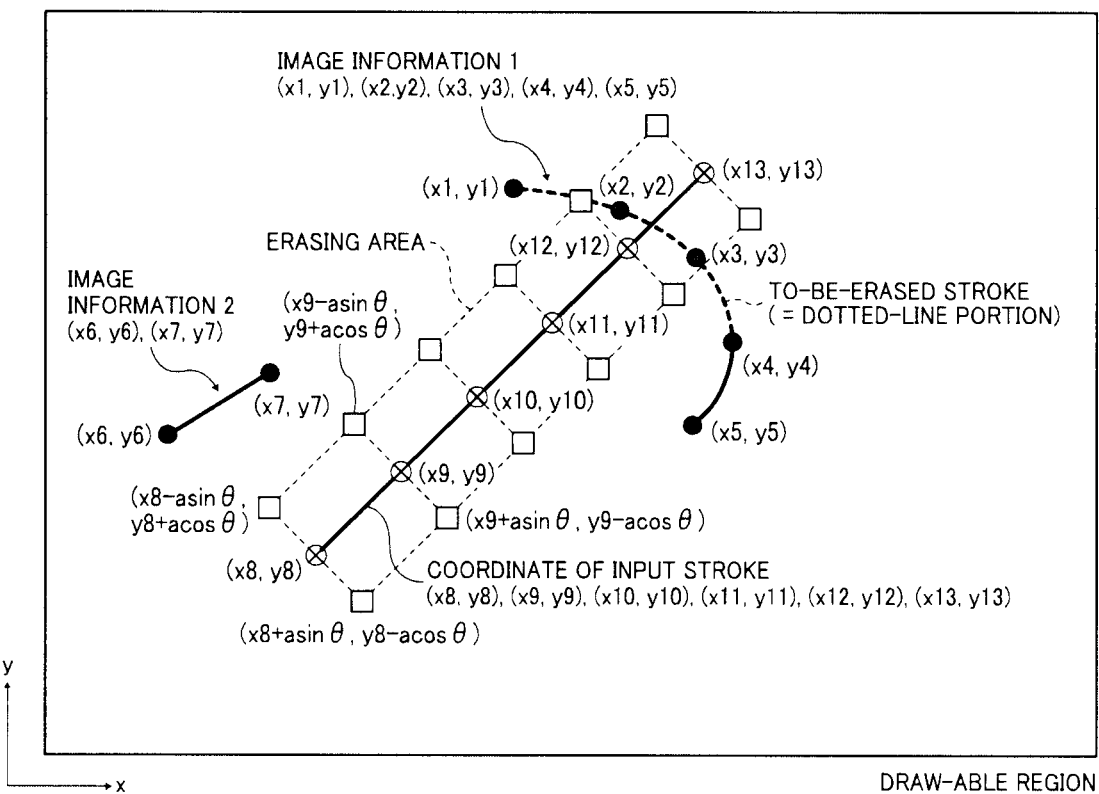
FIG. 22 shows an image-drawing input shown with a solid line, an image-erasing input shown with a thin line, and a to-be-erased portion shown with a dotted line.

As shown in FIG. 22, in the seventh example embodiment, for example, an image-drawing input stroke is displayed by a solid line (e.g., black line on a real screen), an image-erasing input is displayed by a thin line (e.g., red line on a real screen), and a to-be-erased portion is displayed by a dotted line (e.g., grey line on a real screen). As such, a display style of to-be-erased object can be changed by changing color and/or line type, by which a user can confirm which part is to be erased at last, and then a to-be-erased portion can be erased after conducting a mouse-up action. Such a to-be-erased portion is a portion that an image-erasing input line and an image-drawing input line intersect with each other. The number of different colors such as, red, blue, or the like, can be set to any numbers, as required.

[Operation Process]

Figure 23:
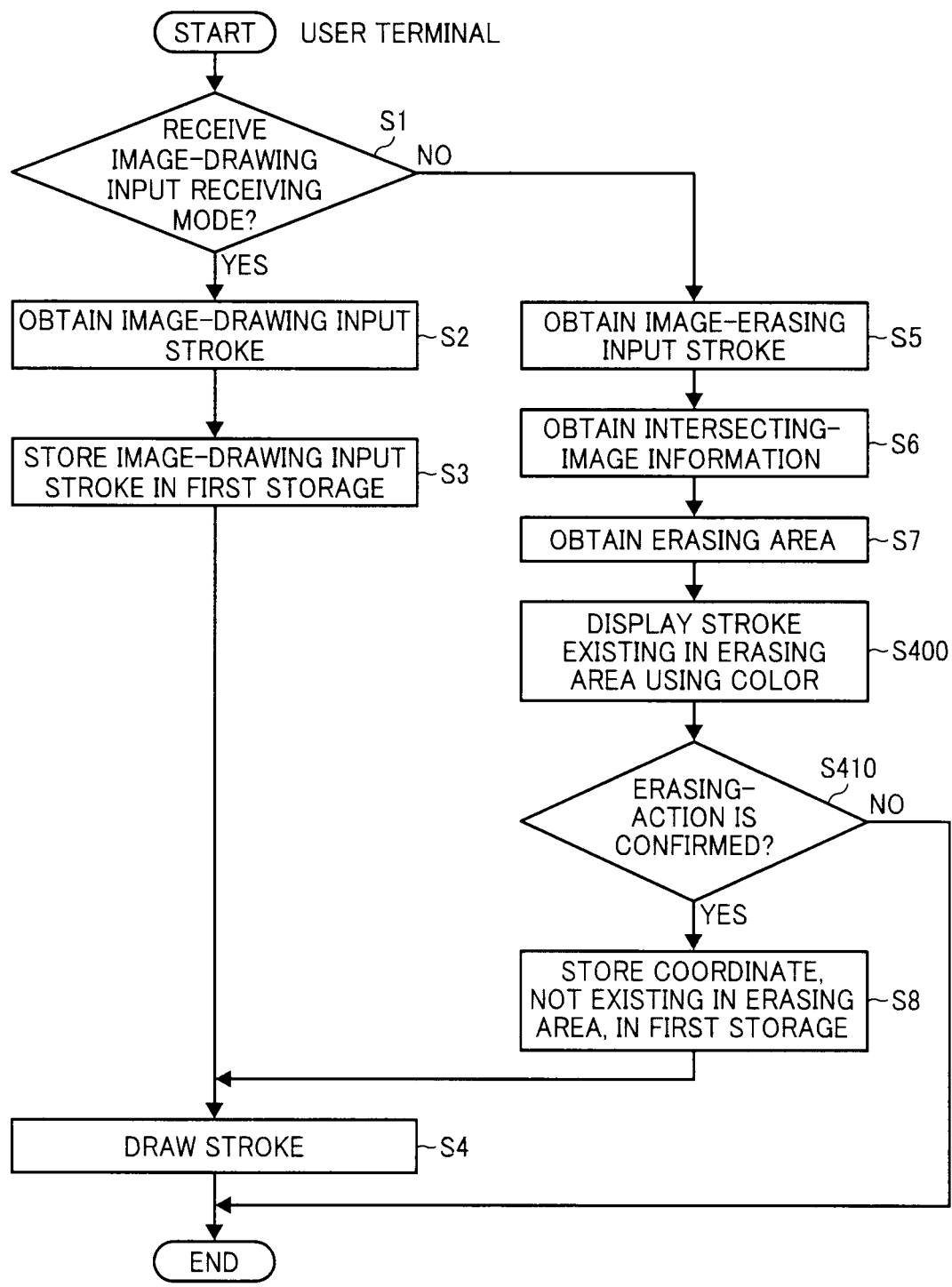
FIG. 23 shows a flowchart explaining steps of operation process conducted by user terminal of a seventh example embodiment.
Figure 24:
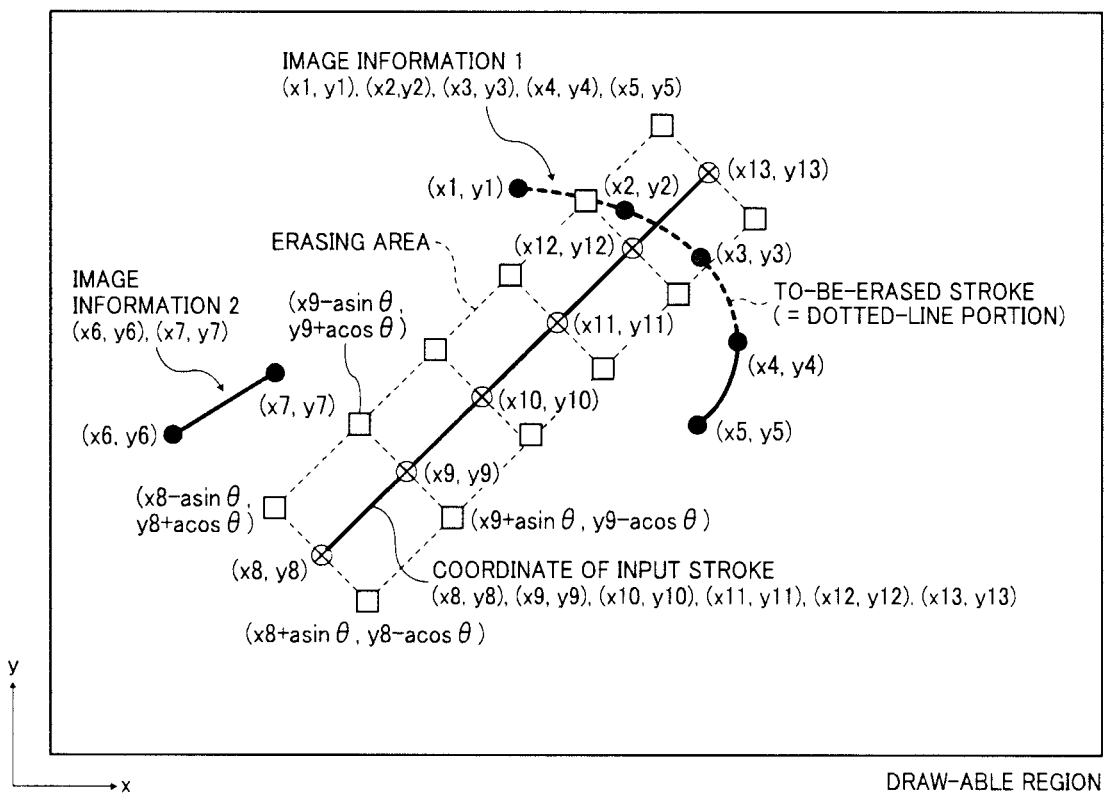
FIG. 24 shows an image-drawing input shown with a solid line, an image-erasing input shown with a thin line, and a to-be-erased portion shown with a dotted line.

FIG. 23 shows a flowchart explaining steps of operation process conducted by the user terminal of the seventh example embodiment. In FIG. 23, same step numbers are attached to same operation processes shown in the first example embodiment of FIG. 4, and a description of such processes may be omitted.

When a user terminal receives an input in the image-erasing input receiving mode (step S1: No in FIG. 23), a stroke input by user is obtained as an image-erasing input stroke (step S5 in FIG. 23), and intersecting-image information is obtained (step S6 in FIG. 23). The user terminal obtains an erasing area based on the information of image-erasing input stroke (step S7 in FIG. 23), and displays a stroke (such as coordinate and line) contained in the erasing area using a given color (step S400 in FIG. 23). Then, the user terminal determines whether an erasing-action is confirmed such as whether a mouse-up action is done (step S410 in FIG. 23). If the erasing-confirmation action is conducted, coordinate contained in the erasing area is erased from the first storage 15a (step S8 in FIG. 23), and a new stroke is drawn (step S4 in FIG. 23). If no coordinate exists in the erasing area, no action is conducted and the process ends.

As above explained, in the seventh example embodiment, a to-be-erased stroke portion may be displayed differently from an image-drawing input stroke and image-erasing input stroke by setting, for example, different style for color, line, or the like for to-be-erased stroke portion, by which a user can easily confirm which part of stroke is to be erased before an erasing is done, and thereby an miss-operation such as erasing wrong portion can be prevented.

Eighth Example Embodiment: Stroke Undo Action

[Configuration]

Figure 25:
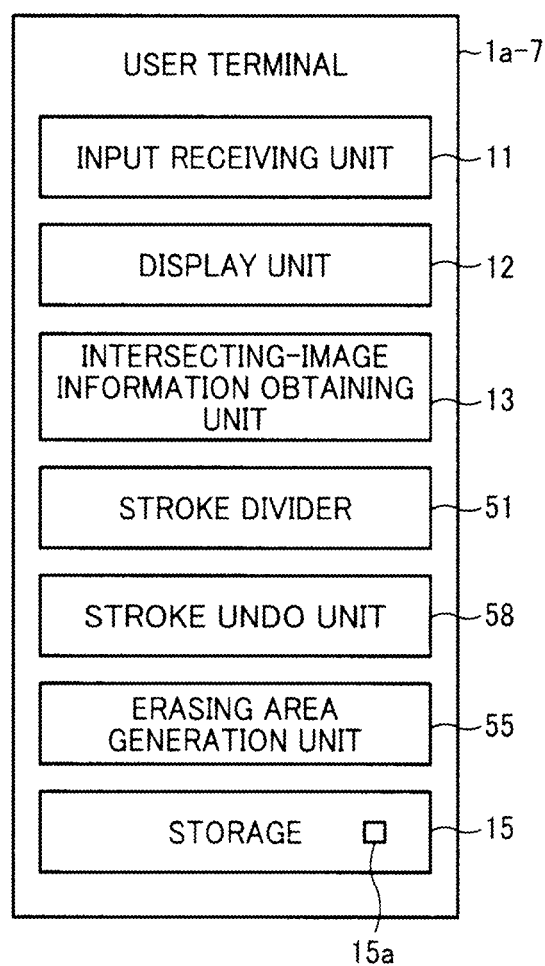
FIG. 25 shows an example overall configuration of user terminal according to a eighth example embodiment.
Figure 27:
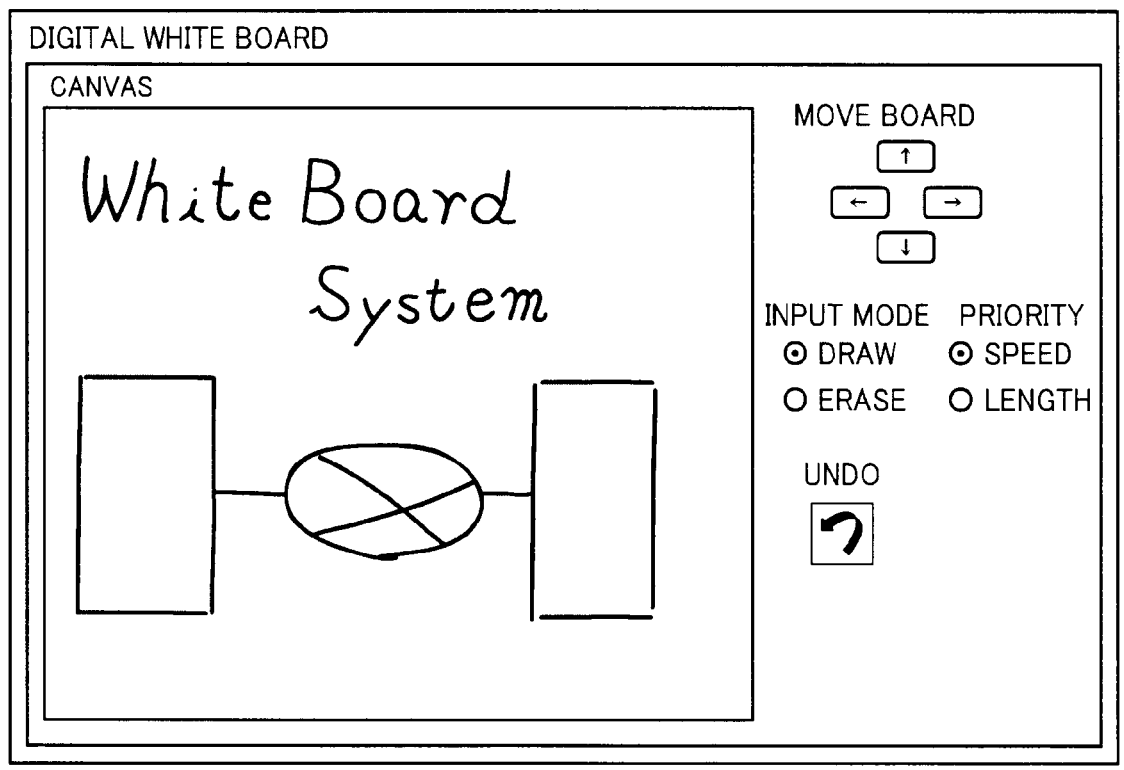
FIG. 27 shows a undo button for restoring or undoing a stroke, which is erased.

FIG. 25 shows an overall configuration of image-drawing processing apparatus according to an eighth example embodiment. When compared to the first example embodiment, a stroke undo unit 58 to restore or undo coordinate, erased by an image-erasing input, is included. In the eighth example embodiment, a description of same elements shown in the first example embodiment may be omitted. The first storage 15a may be a LIFO (last-in first-out) memory to temporarily retain most recent data, such as data before an erasing operation is conducted, in which most-recently written data can be read out first. The stroke undo unit 58 may be activated by pressing, touching, or giving a instruction to an "undo (or return)" button shown in FIG. 27.

[Operation Process]

Figure 26:
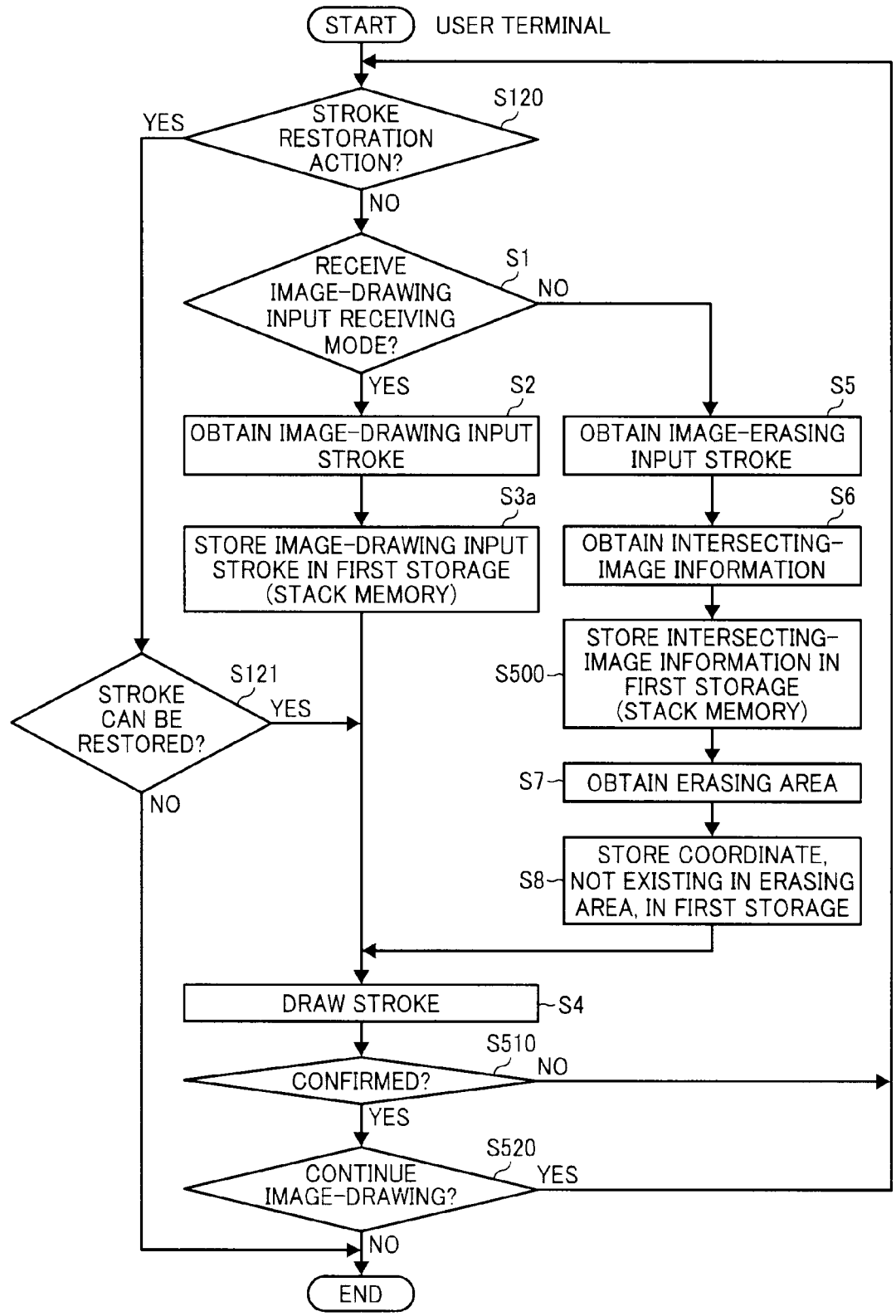
FIG. 26 shows a flowchart explaining steps of operation process conducted by user terminal of the eighth example embodiment.

FIG. 26 shows a flowchart explaining steps of operation process conducted by the user terminal of the eighth example embodiment. In the eighth example embodiment, a description of same elements shown in the first example embodiment may be omitted.

In the eighth example embodiment, a user terminal 1a-7 determines whether a user operation is a stroke undo action (step S120 in FIG. 26). If the stroke undo action is done (step S120: Yes), the user terminal 1a-7 obtains most recent intersecting-image information from the storage 15 or first storage 15a used as a stack memory (step S121: Yes in FIG. 26), and a restored stroke is drawn (step S4 in FIG. 26). If the stroke undo action is not done (step S120: No in FIG. 26) and the image-erasing input receiving mode is used (step S1: No in FIG. 26), a stroke input by user is obtained as an image-erasing input stroke (step S5 in FIG. 26), and intersecting-image information is obtained (step S6 in FIG. 26). Then, the intersecting-image information is stored in the first storage 15a used as a stack memory (step S500 in FIG. 26). The user terminal 1a-7 obtains an erasing area based on an input stroke information (step S7 in FIG. 26), and erases coordinate contained in the erasing area from the first storage 15a and stores coordinate not contained in the erasing area to the first storage 15a (step S8 in FIG. 26), and a new stroke is drawn (step S4 in FIG. 26).

As above explained, in the eighth example embodiment, an erased stroke can be restored or undone, by which a stroke erased by miss operation can be restored or undone easily.

Ninth Example Embodiment: Operation of Server for Erasing by Speed

[Configuration]

Figure 28:
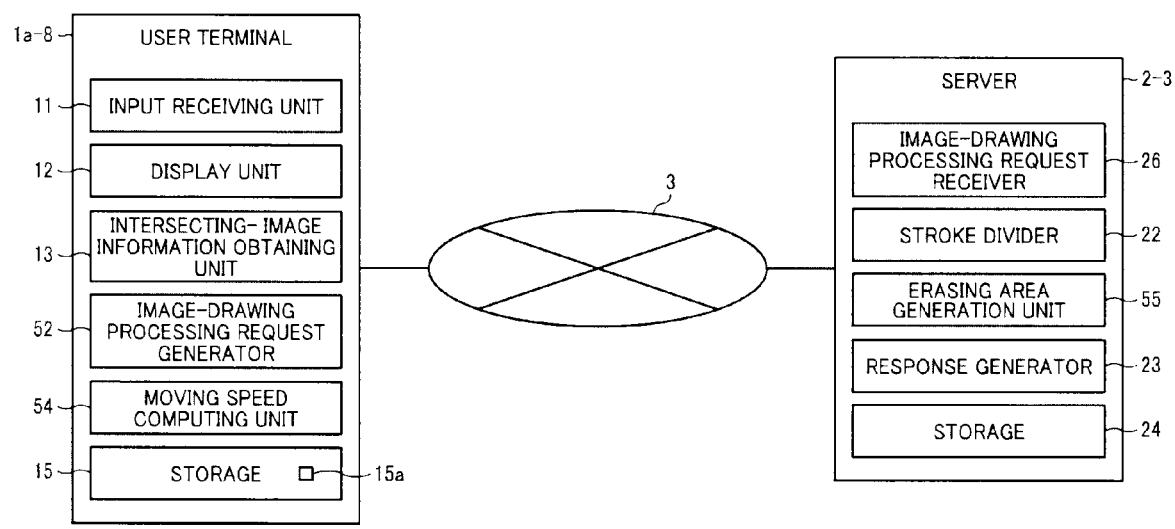
FIG. 28 shows an example overall configuration of image-drawing processing system according to a ninth example embodiment.

FIG. 28 shows an example overall configuration of image-drawing processing system according to a ninth example embodiment. When compared with the second example embodiment, in an image-drawing processing system according to the ninth example embodiment, a server 2-3 may include an erasing area generation unit 55 to generate an erasing area based on a moving speed of image-erasing input stroke, and the stroke divider 22 to erase coordinate of image-drawing input stroke contained in a generated erasing area, in which the stroke divider 22 may be divide and erase stroke. In the ninth example embodiment, a description of same elements shown in the second example embodiment may be omitted.

As such, in the ninth example embodiment, because a size of erasing area can be determined based on a moving speed of image-erasing input, many image objects can be erased by just one input operation of image-erasing input stroke. With such a configuration, when conducting an erasing work each time, a user may not need to operate a conventional menu to select a size of erasing area step-wisely, and many image objects can be erased by inputting a image-erasing input with a faster speed.

[Operation Process]

Figure 29A:
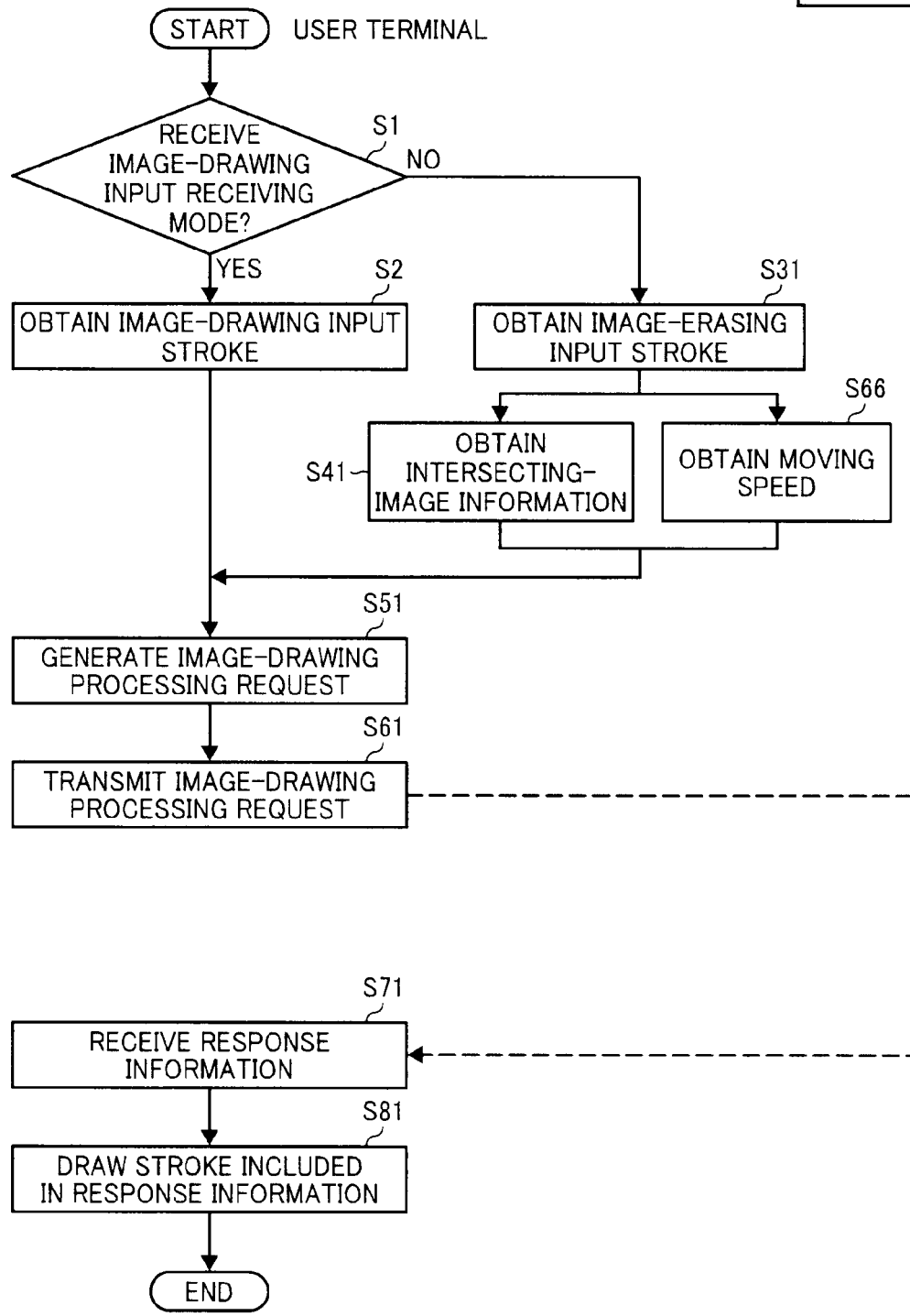
FIGS. 29A and 29B show a flowchart explaining steps of operation process conducted by image-drawing processing system of the ninth example embodiment.
Figure 29B:
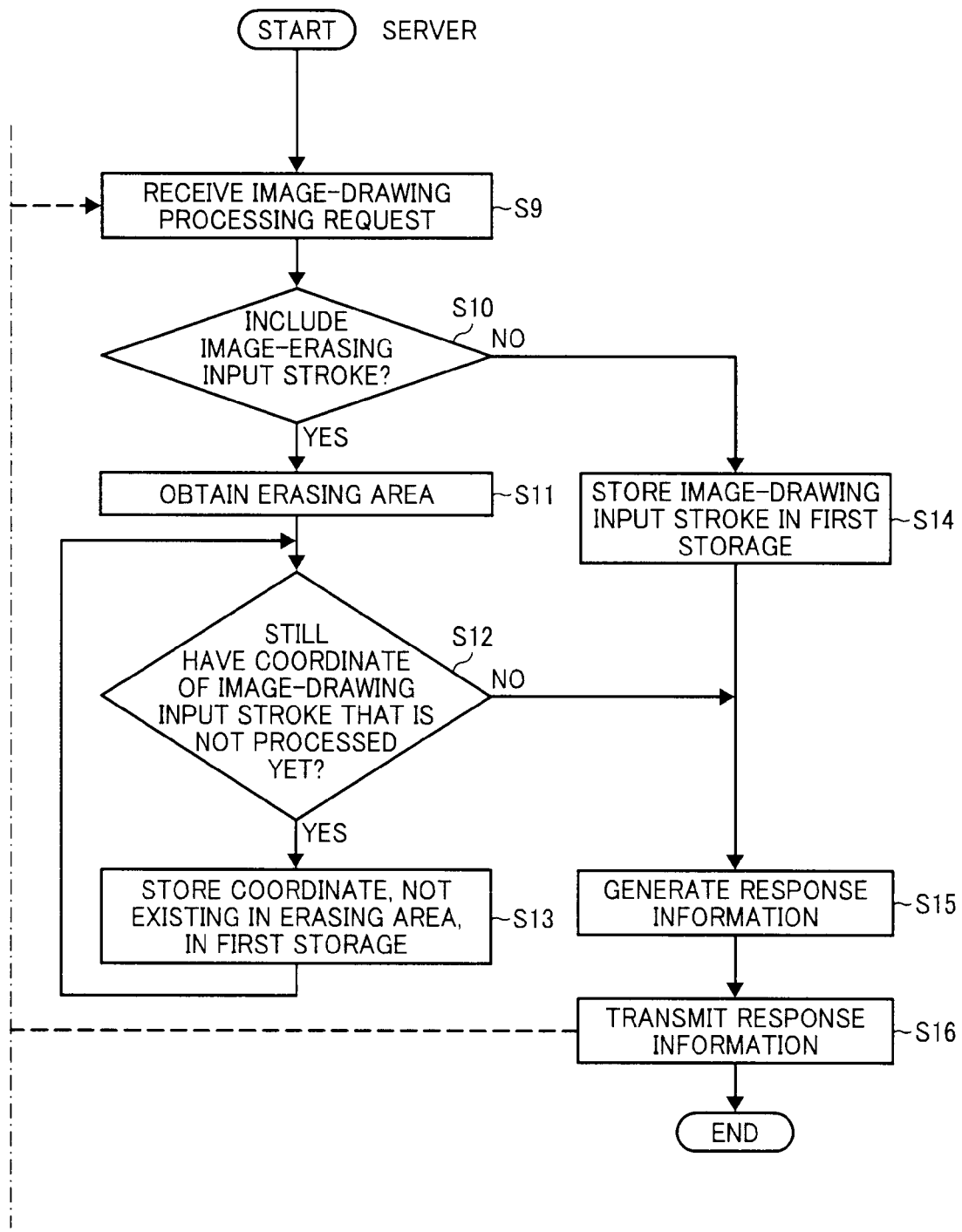

FIGS. 29A and 29B show a flowchart explaining steps of operation process conducted by the image-drawing processing system of the ninth example embodiment. In FIGS. 29A and 29B, same step numbers are attached to same operation processes shown in the second example embodiment of FIGS. 9A and 9B, and a description of such processes may be omitted.

In the image-drawing processing system of the ninth example embodiment, when the user terminal 1a-8 receives an input not under the image-drawing input receiving mode but under the image-erasing input receiving mode (step S1: No), a stroke input by user is obtained as an image-erasing input stroke (step S31 in FIG. 29A).

In the image-drawing processing system, when an image-erasing input stroke is received, the intersecting-image information obtaining unit 13 obtains coordinate data of the image-drawing input stroke intersecting the concerned image-erasing input stroke as intersecting-image information (step S41 in FIG. 29A). Further, the moving speed computing unit 54 computes a moving speed of the concerned image-erasing input stroke based on an elapsing time (for example, measured by seconds) between an input-start time (e.g., mouse-down timing) and an input-end time (e.g., mouse-up timing), and a distance (for example, measured by pixels) of image-erasing input stroke (step S66 in FIG. 29A).

The intersecting-image information obtained by the intersecting-image information obtaining unit 13, and the moving speed computed by the moving speed computing unit 54 are stored in the storage 15.

Then, the image-drawing processing request generator 52 extracts (or retrieves) all image-erasing and image-drawing input strokes, the intersecting-image information, and the moving speed from the storage 15 to generate an image-drawing processing request (step S51 in FIG. 29A).

A description is now given to operation process of a server 2-3 that receives an image-drawing processing request from the user terminal 1a-8. The server 2-3 receives the image-drawing processing request (step S9 in FIG. 29B). If a received image-drawing processing request includes an image-erasing input stroke (step S10: Yes in FIG. 29B), the erasing area generation unit 55 obtains an erasing area based on the information of image-erasing input stroke and moving speed of image-erasing input stroke included in the image-drawing processing request (step S11 in FIG. 29B). A process of generating an erasing area can be conducted as similar to the fourth example embodiment, and thereby the explanation of generation process of erasing area may be omitted.

Then, the server 2-3 determines whether each coordinate of image-drawing input stroke exists in the concerned erasing area (step S12 in FIG. 29B), and stores coordinate, not contained in the erasing area, to the first storage (step S13 in FIG. 29B). In step S12, each coordinate of image-drawing input stroke is determined whether each coordinate exists in the concerned erasing area, and the determination process continues until all coordinates of image-drawing input stroke is checked. The server 2-3 stores coordinate, not contained in the erasing area, to the storage 24 including a first storage (step S13 in FIG. 29B). The subsequent step is similar to FIG. 9, and thereby an explanation may be omitted.

As above explained, in the ninth example embodiment, because a size of erasing area can be determined based on a moving speed of image-erasing input, switching of erasing area can be conducted modelessly. With such a configuration, when conducting an erasing work each time, a user may not need to operate a conventional menu to select a size of erasing area, by which an efficient operation can be devised.

Tenth Example Embodiment: Erasing by Length

Figure 30:
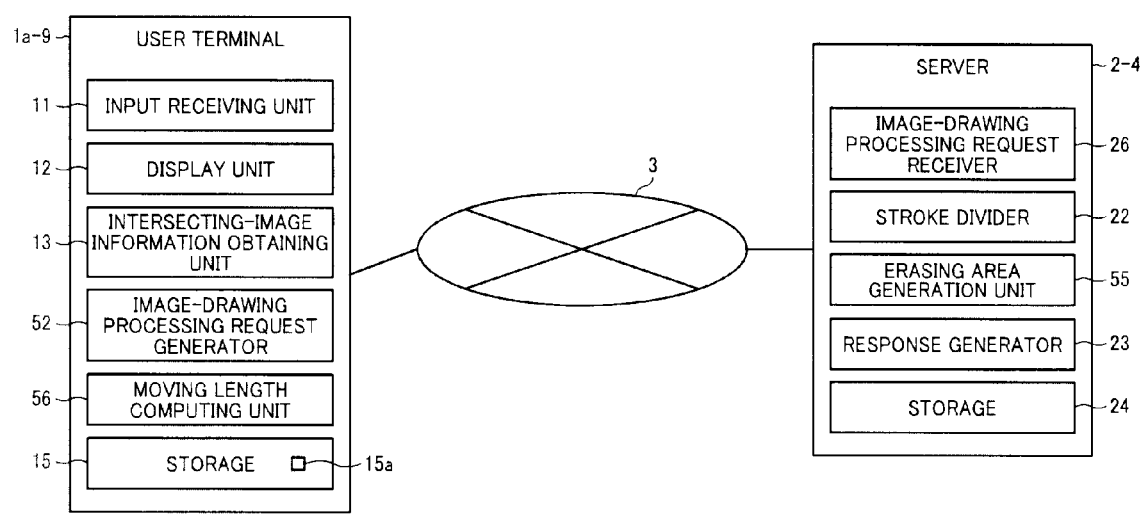
FIG. 30 shows an example overall configuration of image-drawing processing system according to a tenth example embodiment.

[Configuration]
FIG. 30 shows an example overall configuration of image-drawing processing system according to a tenth example embodiment. When compared with the ninth example embodiment, in an image-drawing processing system according to the tenth example embodiment, a server 2-4 may include the erasing area generation unit 55 to generate an erasing area based on a moving length of image-erasing input stroke. In the tenth example embodiment, a description of same elements shown in the ninth example embodiment may be omitted.

As such, in the tenth example embodiment, because a size of erasing area can be determined based on a moving length of image-erasing input, many image objects can be erased by just one input operation of image-erasing input stroke. With such a configuration, when conducting an erasing work each time, a user may not need to operate a conventional menu to select a size of erasing area of eraser device step-wisely, and many image objects can be erased by inputting a longer moving length for image-erasing input stroke.

Figure 31B:
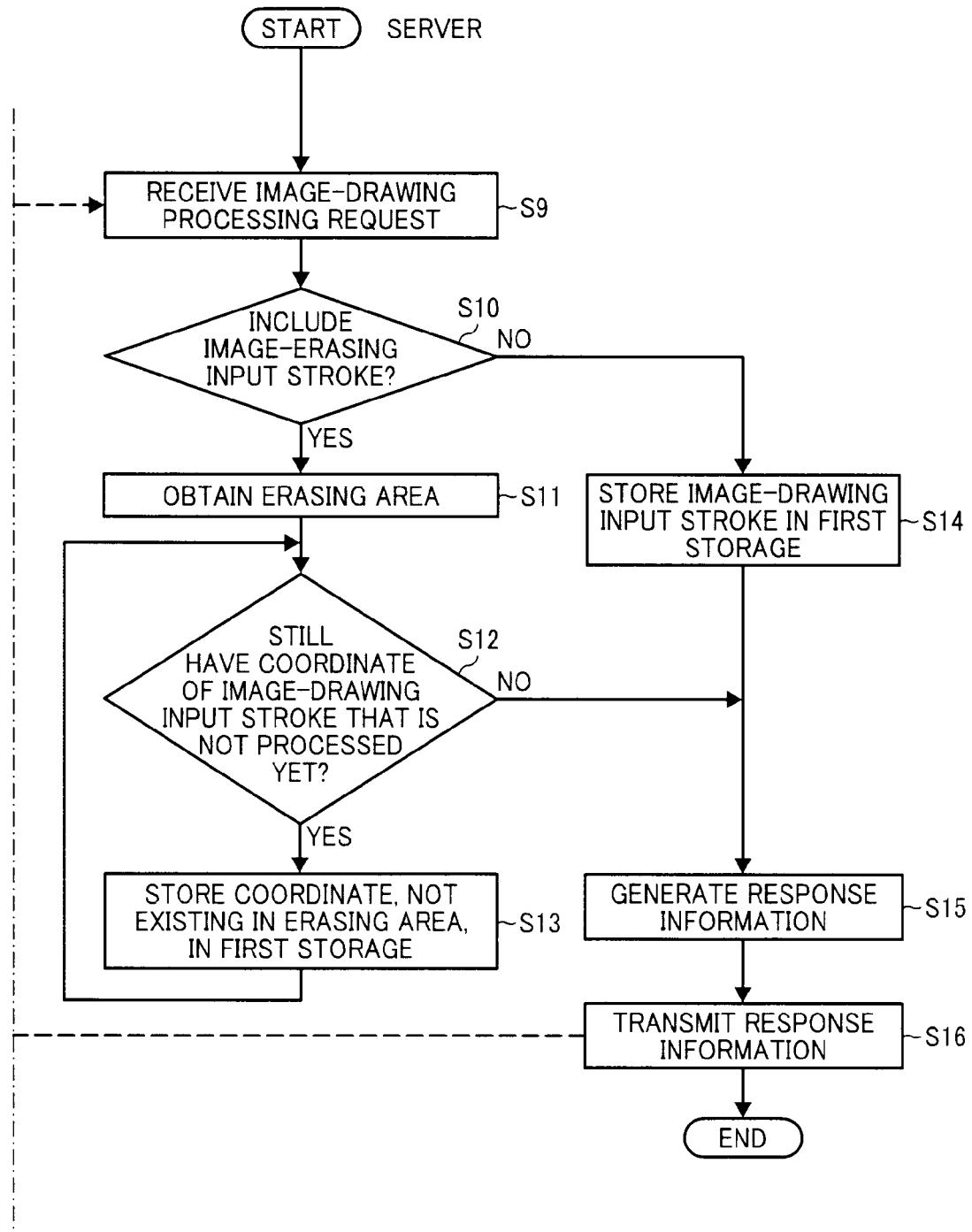

[Operation Process]
FIGS. 31A and 31B show a flowchart explaining steps of operation process conducted by the image-drawing processing system of the tenth example embodiment. In FIGS. 31A and 31B, same step numbers are attached to same operation processes shown in the ninth example embodiment of FIGS. 29A and 29B, and a description of such processes may be omitted.

In the tenth example embodiment, when a user terminal 1a-9 receives an image-erasing input stroke, the intersecting-image information obtaining unit 13 obtains coordinate data of image-drawing input stroke intersecting the concerned image-erasing input stroke as intersecting-image information (step S41 in FIG. 31A). Further, the moving length computing unit 56 computes a moving length based on a distance (for example, measured by pixels) of image-erasing input stroke between an input-start time (e.g., mouse-down timing) and an input-end time (e.g., mouse-up timing) (step S66a in FIG. 31A).

The intersecting-image information obtained by the intersecting-image information obtaining unit 13, and the moving length computed by the moving length computing unit 56 are stored in the storage 15.

Then, the image-drawing processing request generator 52 extracts (or retrieves) all image-erasing and image-drawing input strokes, the intersecting-image information, and the moving length from the storage 15 to generate an image-drawing processing request (step S51 in FIG. 31A).

A description is now given to operation process of a server 2-4 that receives an image-drawing processing request from the user terminal 1a-9. The server 2-4 receives the image-drawing processing request (step S9 in FIG. 31B). If a received image-drawing processing request includes an image-erasing input stroke (step S10: Yes in FIG. 31B), the erasing area generation unit 55 obtains an erasing area based on the information of image-erasing input stroke and moving length of image-erasing input stroke included in the image-drawing processing request (step S11 in FIG. 31B). A process of generating an erasing area can be conducted as similar to the fourth example embodiment, and thereby the explanation of generation process of erasing area may be omitted.

Then, the server 2-4 determines whether each coordinate of image-drawing input stroke exists in the concerned erasing area (step S12 in FIG. 31B), and stores coordinate, not contained in the erasing area, to the first storage (step S13 in FIG. 31B). In step S12, each coordinate of image-drawing input stroke is determined whether the each coordinate exists in the concerned erasing area, and such determination process continues until all coordinates of image-drawing input stroke is checked. The server 2-4 stores coordinate, not contained in the erasing area, to the storage 24 including a first storage (step S13 in FIG. 31B). The subsequent step is similar to FIGS. 29A and 29B, and thereby an explanation may be omitted.

As above explained, in the tenth example embodiment, because a size of erasing area can be determined based on a moving length of image-erasing input, switching of erasing area can be conducted modelessly. With such a configuration, when conducting an erasing work each time, a user may not need to operate a conventional menu to select a size of erasing area, by which an efficient operation can be devised.

Eleventh Example Embodiment: Erasing by Shape

Figure 32:
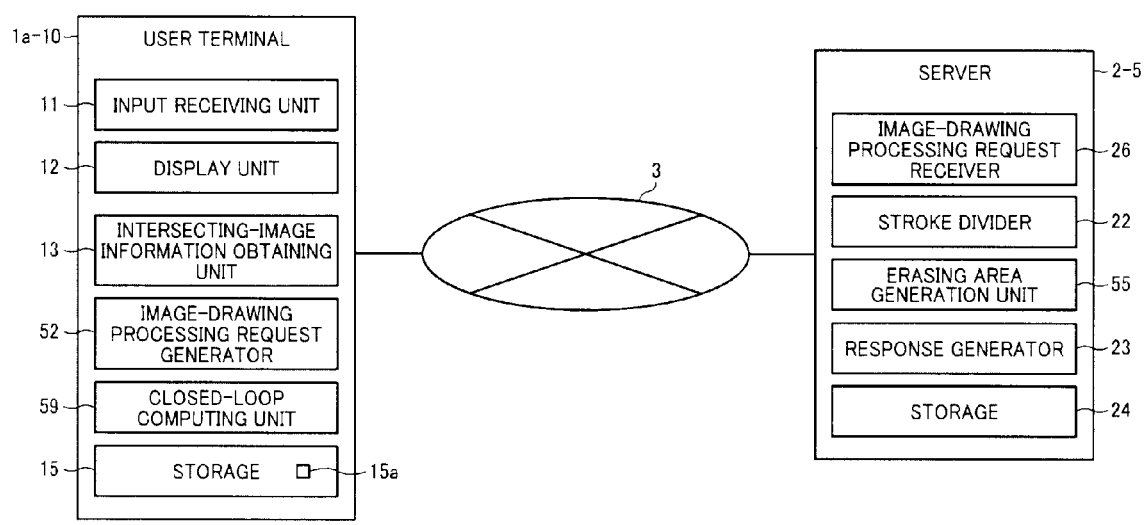
FIG. 32 shows an example overall configuration of image-drawing processing system according to an eleventh example embodiment.

[Configuration]
FIG. 32 shows an example overall configuration of image-drawing processing system according to an eleventh example embodiment. When compared with the ninth and tenth example embodiments, in the eleventh example embodiment, a user terminal 1a-10 may include the closed-loop computing unit 59 to determine whether an image-erasing input stroke forms a closed loop, and a server 2-5 may include the stroke divider 22 to divide a stroke. When an image-erasing input stroke is a closed loop and any one of coordinates composing an image-drawing input stroke exists inside the closed loop, the stroke divider 22 erases all coordinates composing the image-drawing input stroke, by which a whole of the image-drawing input stroke (or a whole object) can be erased. Further, when an image-erasing input stroke is not a closed loop (i.e. partially closed loop), an erasing area is obtained as similar to the above-described embodiments, and coordinate of the image-drawing input stroke contained inside a partially closed loop is erased (referred to partial erasing). In the eleventh example embodiment, a description of same elements shown in the first example embodiment may be omitted.

Figure 33B:
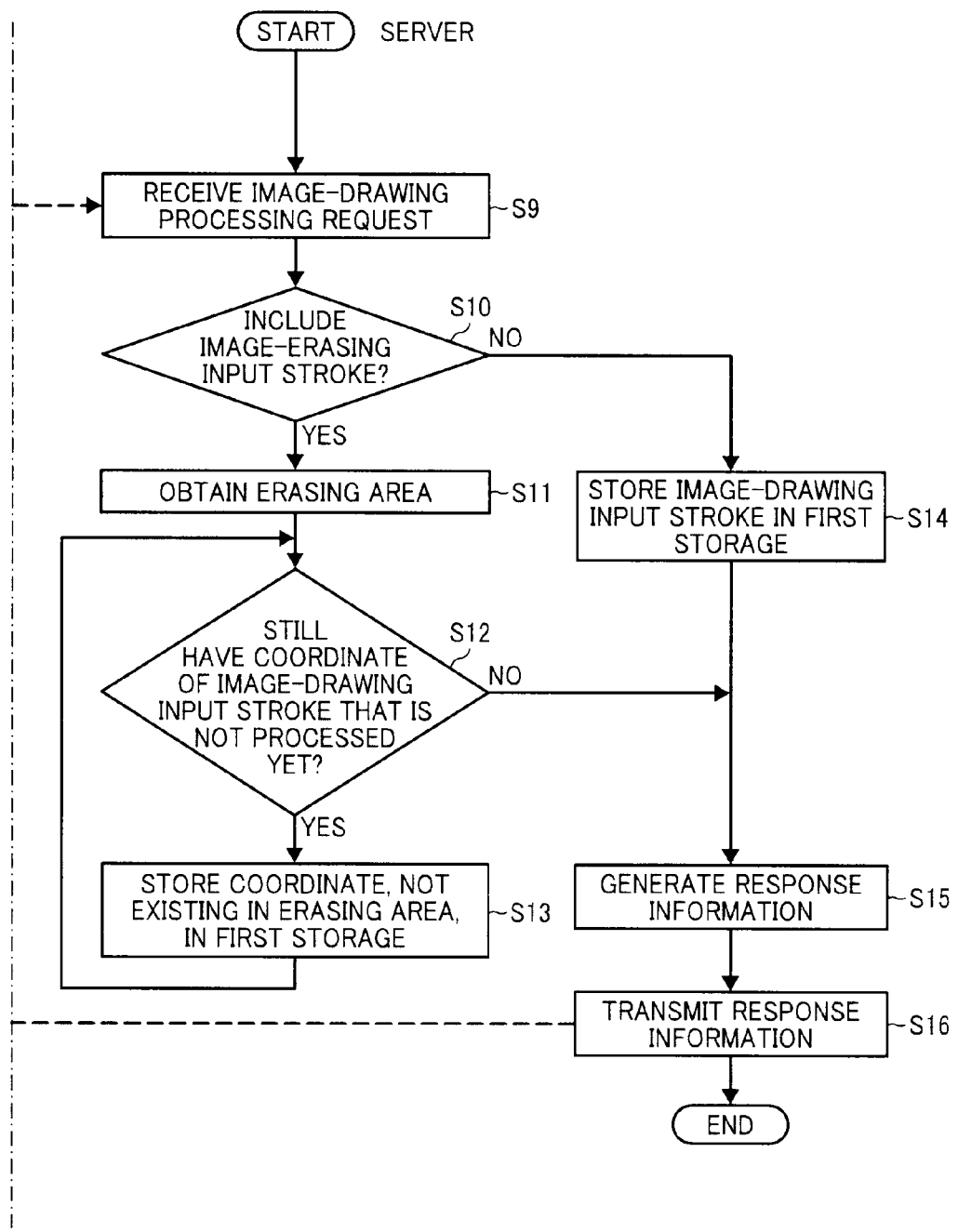

FIGS. 33A and 333 show a flowchart explaining steps of operation process conducted by the image-drawing processing apparatus of the eleventh example embodiment. In FIGS. 33A and 33B, same step numbers are attached to same operation processes shown in FIGS. 29A/29B and 31A/31B referred to as ninth and tenth example embodiments, and a description of such processes may be omitted.

In the eleventh example embodiment, when an image-erasing input stroke is received, the closed loop computing unit 59 determines whether the image-erasing input stroke is a closed loop (step S300 in FIG. 33A).

A result whether a closed loop is formed or not may be stored in the first storage 15a. When the image-erasing input stroke is not a closed loop, intersecting-image information obtained by the intersecting-image information obtaining unit 13 is stored in the first storage 15a. Then, the image-drawing processing request generator 52 extracts (or retrieves) all image-erasing and image-drawing input strokes, the intersecting-image information, and the determination result of closed loop from the storage 15 to generate an image-drawing processing request (step S51 in FIG. 33A). A process by the closed-loop computing unit 59 can be conducted as similar to the sixth example embodiment, and thereby the explanation may be omitted.

A description is now given to operation process of a server 2-5 that receives an image-drawing processing request from the user terminal 1a-10. The server 2-5 receives the image-drawing processing request (step S9 in FIG. 33B). The received image-drawing processing request may include an image-erasing input stroke (step S10: Yes in FIG. 33A), which is determined as the closed loop in step S300. When the image-erasing input stroke forms a closed loop and any one of coordinates composing the image-drawing input stroke exists inside the image-erasing input stroke, all coordinates composing the concerned image-drawing input stroke are erased. In such a case, response information is generated based on an identifier of the concerned image-drawing input stroke that is a to-be-erased image-drawing input stroke (step S15 in FIG. 33B), and the response information is transmitted to the user terminal 1a-10 (step S16 in FIG. 33B).

When strokes identified by pos1 and pos2 are to be erased by an erasing operation, response information can be specified, for example, by JSON format as shown in (21).

["cmd":"erase","id":[pos1,pos2]]  (21)

As above explained, in the eleventh example embodiment, by determining whether stroke information is a closed loop, partial erasing of object and entire erasing of object can be switched modelessly. With such a configuration, when conducting an erasing work each time, a user may not need to operate a conventional menu to select partial erasing of object and entire erasing of object, by which an efficient operation can be devised.

Twelfth Example Embodiment: Stroke Restoration Action

[Configuration]

Figure 34:
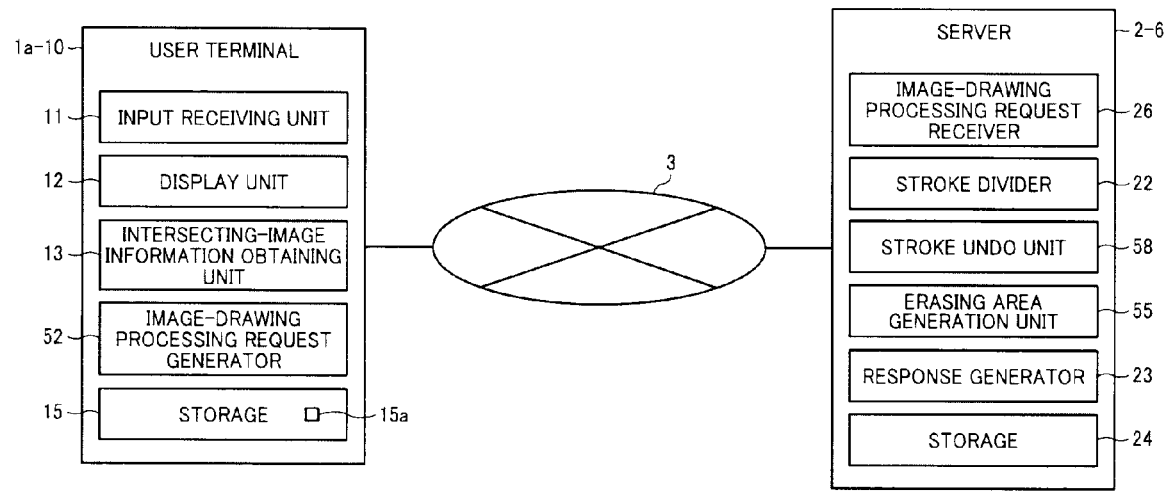
FIG. 34 shows an example overall configuration of image-drawing processing system according to a twelfth example embodiment.

FIG. 34 shows a overall configuration of image-drawing processing apparatus according to a twelfth example embodiment. When compared with the eighth example embodiment, a server 2-6 may include the stroke undo unit 58 to restore coordinate erased by an image-erasing input. In the twelfth example embodiment, a description of same elements shown in the eighth example embodiment may be omitted. When the "undo" button (see FIG. 27) is pressed, a user terminal 1a-10 issues an image-drawing processing request with following format (22), for example.

http://somewhere/canvas?cmd=undo  (22)

As shown in FIGS. 35A and 35B, when receiving an image-drawing processing request, the server 2-6 obtains most recent intersecting-image information from the first storage 15a used as a stack memory, and generates response information including intersecting-image information. The response information may be specified, for example, with JSON format as shown in following (23), in which it is assumed that intersecting-image information pos1 having (x1,y1) and (x2,y2), and pos2 having (x3,y3) and (x4,y4) are most-recently erased information.

["cmd":"undo","result":[["id":pos1,"pos":[[x1,y1],[x2,y2]]],["id":pos2,"pos":[[x3,y3],[x4,y4]]]]]  (23)

As shown in FIGS. 35A and 35B, if the server 2-6 does not receive an image-drawing processing request, the user terminal 1a-10 determines whether an image-erasing input exists. If the image-erasing input exists, intersecting-image information included in an image-drawing processing request is stored in the first storage 15a used as a stack memory. The subsequent step is similar to the eleventh example embodiment, and thereby an explanation may be omitted.

As above explained, in the twelfth example embodiment, an erased stroke can be restored, by which a stroke, erased by miss operation, can be restored easily.

[Hardware Configuration]

A description is now given to hardware configurations of user terminal 1 and server 2 employed in the above described example embodiments.

Figure 36:
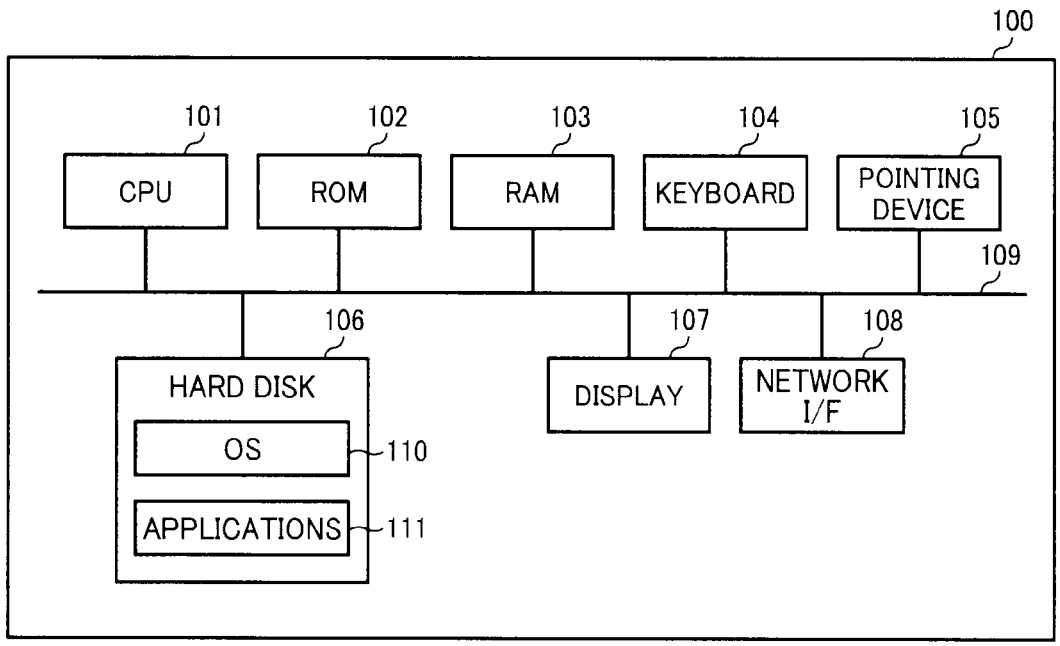
FIG. 36 shows an example hardware configuration of information processing apparatus for user terminal of example embodiments.

As shown in FIG. 36, the user terminal 1 may be an information processing apparatus 100, by which each participant of meeting can refer, input, or edit information, and the information processing apparatus 100 may be available as desktop type personal computers, notebook type personal computers, portable information terminal devices such as personal digital assistants (PDA), electronic board such as whiteboard or the like, but not limited thereto, and a size of the information processing apparatus 100 may be changed in view of user needs or the like. Hereinafter, an example hardware configuration of the user terminal 1 (e.g., notebook type personal computer) is explained with reference to FIG. 36, which shows an example block diagram of electrically connected units in the information processing apparatus 100. As such, FIG. 36 shows an example hardware configuration of information processing apparatus 100 (such as the user terminal 1) used for example embodiments.

As shown in FIG. 36, the information processing apparatus 100 (used as the user terminal 1) is a computer system, which may include a central processing unit (CPU) 101, a read only memory (ROM) 102, and a random access memory (RAM) 103, in which the CPU 101 controls the system as a whole, the ROM 102 stores activation program or the like, and the RAM 103 is used as a working memory area for the CPU 101. The information processing apparatus 100 may further include a keyboard 104, a pointing device 105, a hard disk 106, a display 107, a network interface (I/F) 108, and a bus 109. The keyboard 104 is used to input text, characters, numbers, instructions, or the like, the display 107 is a display device such as LCD (liquid crystal display) or the like, the network I/F 108 is used to connect with the network 3, and the bus 109 is used to connect the above-mentioned units in the information processing apparatus 100.

The pointing device 105 may, typically, be a mouse, a touch pad, a track ball or the like, which is used to move a cursor, to select an area, or the like, but not limited thereto. In the present invention, the pointing device 105 may be used as an information unit to input information, and may be used as an unit to detect coordinate.

For example, a pointing device such as a mouse may be used as a coordinate detector. For example, when a mouse is used for input operation event, a "mouse-button down" action corresponds to an input start, a "mouse-button up" action corresponds to an input end, and a "mouse-button down-and-moving" action corresponds to an inputting-continued movement (i.e., stroke is in inputting).

Such an information input unit used for detecting coordinate may be a mouse, but not limited thereto. For example, such information input unit may be a pointer or pointing device such as a fingertip, pen, or the like, by which a coordinate position in a coordinate detection area can be pointed and detected. Further, the information input unit may be an information input/output unit such as touch panel type, which is integrally placed on a displaying side of display screen used as a display unit. In such an information input/output unit, one face can be used both of displaying (or outputting) information and writing (or inputting) information.

Detection of coordinate can be conducted by known methods such as for example a light shield method (see JP-2000-105671-A); a light reflection method, in which a pointer is inserted to reflect light flux in a coordinate detection area to detect such a pointing position; a camera capturing method, in which a pointer in a coordinate detection area is captured by a camera to detect a pointing position; a light-emitting diode (LED) array method; a ultrasonic elastic wave method, an analog capacitive coupling method, a pressure-sensitive method, or the like.

The hard disk 106 stores operating system (OS) 110, and various application programs (AP) 111 such as image drawing software, word processor software, spreadsheet software, presentation software, or the like.

The server 2 may be an information processing apparatus 200, by which information input by each user terminal can be shared. Hereinafter, an example hardware configuration of the server 2 is explained with reference to FIG. 37, which shows an example block diagram of electrically connected units in the information processing apparatus 200. As such, FIG. 37 shows an example hardware configuration of information processing apparatus 200 (such as the server 2) of example embodiments.

Figure 37:
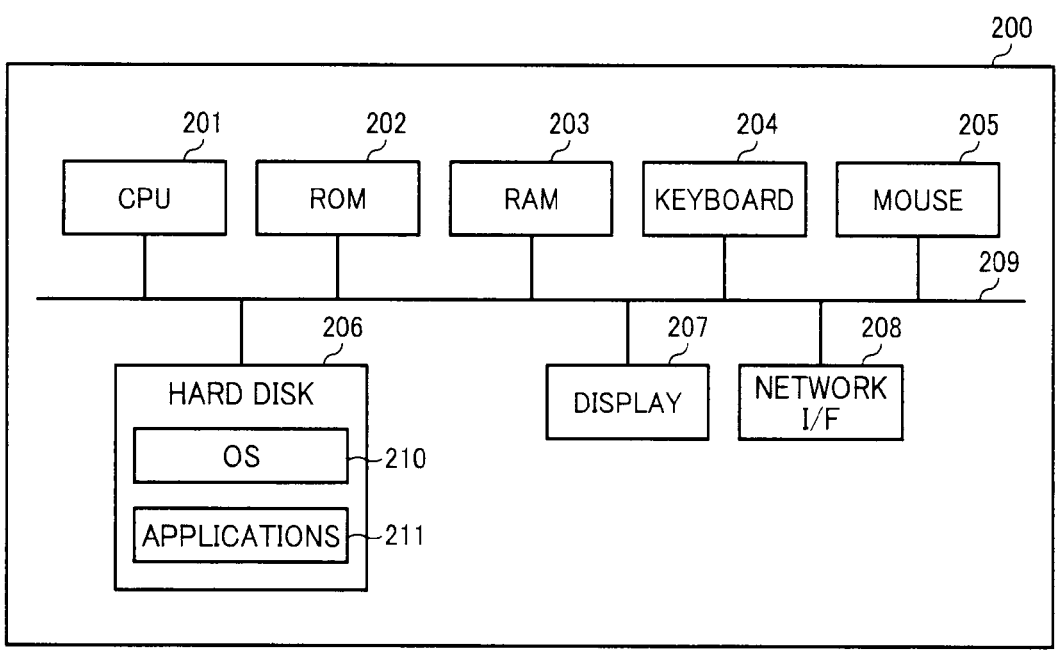
FIG. 37 shows an example hardware configuration of information processing apparatus for server of example embodiments.

As shown in FIG. 37, the information processing apparatus 200 (used as the server 2) is a computer system, which may include a central processing unit (CPU) 201, a read only memory (ROM) 202, and a random access memory (RAM) 203, in which the CPU 201 controls the system as a whole, the ROM 202 stores activation program or the like, and the RAM 203 is used as a working memory area for the CPU 201. The information processing apparatus 200 may further include a keyboard 204, a mouse 205, a hard disk 206, a display 207, a network interface (I/F) 208, and a bus 209. The keyboard 204 is used to input text, characters, numbers, instructions, or the like, the display 207 is a display device such as an LCD (liquid crystal display) or the like, the network I/F 208 is used to connect with the network 3, and the bus 209 is used to connect the above mentioned units in the information processing apparatus 200.

The hard disk 206 stores operating system (OS) 210, and various application programs (AP) 211 such as image drawing software, word processor software, spreadsheet software, presentation software, or the like.
(Program)

Further, the above described flowchart processes shown in each drawing can be prepared as a computer-readable program, which can be executed by a CPU of information processing apparatus. Such a program can be stored in a storage medium such as a semiconductor storage, an optical storage, a magnetic storage, or the like. Further, such a program and storage medium can be used in system, which may be different from the above-described example embodiments, and by executing the program using a CPU of system, an effect similar to the above-described example embodiments can be devised. As such, in the above-described exemplary embodiments, a computer can be used with a computer-readable program to control functional units used for an information processing system or apparatus. For example, a particular computer may control the information processing apparatus using a computer-readable program, which can execute the above-described processes or steps. Further, in the above-described exemplary embodiments, a storage device (or recording medium), which can store computer-readable program, may be a flexible disk, a CD-ROM (compact disk read only memory), DVD (digital versatile disk), a memory card, a memory chip, or the like, but not limited these. Further, a computer-readable program can be downloaded to a particular computer (e.g., personal computer) via a network, or a computer-readable program can be installed to a particular computer from the above-mentioned storage device, by which the particular computer may be used for the information processing system or apparatus according to example embodiments, for example.

As described above, by managing image objects using information of coordinate of image, a network load when conducting information sharing can be reduced, and any portion of image objects can be erased effectively, by which a user's convenience for image-drawing processing and/or image-drawing sharing can be enhanced.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:
1. A system, comprising:
circuitry configured to perform:
  receiving input information relating to image-drawing and image-erasing;
  obtaining more than one image-drawing input stroke and an image-erasing input stroke;
  determining that the image-erasing input stroke forms a closed loop when a distance between the beginning and ending points of the closed loop does not exceed a threshold number of pixels;
  erasing, using a first erasing process, all coordinates of all the image-drawing input strokes, when any one of the coordinates of at least one image-drawing input stroke exists within the closed loop;
  determining that the image-erasing input stroke forms a partially closed loop when the distance between the beginning and ending points of the image-erasing input stroke exceeds the threshold number of pixels;
  erasing, using a second erasing process, the portion of the coordinates of the image-drawing input strokes within the partially closed loop;
wherein the circuitry is further configured to perform:
  in response to determining that the image-erasing input stroke does not form a loop;
  computing a length of the image-erasing input stroke, generating an erasing area with a width which changes based on the length, the erasing area including regions with the width extending from two sides of each point that forms the image-erasing input stroke, wherein the longer the length of the image-erasing input stroke, the wider the width associated with the erasing area, and erasing, using a third erasing process, the portion of the coordinates of the image-drawing input strokes within the erasing area.

2. The system of claim 1, wherein:
a color of a to-be-erased portion of coordinates of the image-drawing input strokes is displayed differently from a color used for displaying the other coordinates of the image-drawing input strokes and image-erasing input stroke.

3. The system of claim 1, wherein the circuitry is further configured to:
undo erasing of an image-drawing input stroke erased by the image-erasing input stroke.

4. The system according to claim 1, wherein:
the circuitry is configured such that after the circuitry performs the third erasing process, the width of the erasing area automatically returns to a predetermined width.

5. The system according to claim 1, wherein:
the third erasing process generates the erasing area to be a region defined by corners having coordinates:

$(X1-a^*\sin\theta, Y1+a^*\cos\theta),$ $(X1+a^*\sin\theta, Y1-a^*\cos\theta)$ $(X2+a^*\sin\theta, Y2-a^*\cos\theta),$ and, $(X2-a^*\sin\theta, Y2+a^*\cos\theta),$ where:
(X1, Y1) is a first coordinate of the image-erasing input stroke,
(X2, Y2) is a second coordinate of the image-erasing input stroke,
$\cos\theta = (X2-X1)/r,$
$\sin\theta = (Y2-Y1)/r,$
$r = \sqrt{[(X2-X1)^2+(Y2-Y1)^2]},$ and
"a" corresponds to the length.

6. A non-transitory computer-readable medium storing a program comprising instructions that when executed by a computer cause the computer to execute a method of processing image-drawing, the method comprising the steps of:
receiving input information relating to image-drawing and image-erasing;
obtaining more than one image-drawing input stroke and an image-erasing input stroke;
determining that the image-erasing input stroke forms a closed loop when a distance between the beginning and ending points of the closed loop does not exceed a threshold number of pixels;
erasing, using a first erasing process, all coordinates of all the image-drawing input strokes, when any one of the coordinates of at least one image-drawing input stroke exists within the closed loop;
determining that the image-erasing input stroke forms a partially closed loop when the distance between the beginning and ending points of the image-erasing input stroke exceeds the threshold number of pixels;
erasing, using a second erasing process, the portion of the coordinates of the image-drawing input strokes within the partially closed loop;
wherein the circuitry is further configured to perform:
in response to determining that the image-erasing input stroke does not form a loop;
computing a length of the image-erasing input stroke;
generating an erasing area with a width which changes based on the length, the erasing area including regions with the width extending from two sides of each point that forms the image-erasing input stroke, wherein the longer the length of the image-erasing input stroke, the wider the width associated with the erasing area, and
erasing, using a third erasing process, the portion of the coordinates of the image-drawing input strokes within the erasing area.

7. The non-transitory computer-readable medium according to claim 6, wherein:
after the third erasing process, the width of the erasing area automatically returns to a predetermined width.

8. The non-transitory computer-readable medium according to claim 6, wherein:
the third erasing process generates the erasing area to be a region defined by corners having coordinates:

$(X1-a^*\sin\theta, Y1+a^*\cos\theta),$ $(X1+a^*\sin\theta, Y1-a^*\cos\theta)$ $(X2+a^*\sin\theta, Y2-a^*\cos\theta),$ and, $(X2-a^*\sin\theta, Y2+a^*\cos\theta),$ where:
(X1, Y1) is a first coordinate of the image-erasing input stroke,
(X2, Y2) is a second coordinate of the image-erasing input stroke,
$\cos\theta = (X2-X1)/r,$
$\sin\theta = (Y2-Y1)/r,$
$r = \sqrt{[(X2-X1)^2+(Y2-Y1)^2]},$ and
"a" corresponds to the length.

9. A computer implemented method, comprising:
receiving input information relating to image-drawing and image-erasing;
obtaining more than one image-drawing input stroke and an image-erasing input stroke;
determining that the image-erasing input stroke forms a closed loop when a distance between the beginning and ending points of the closed loop does not exceed a threshold number of pixels;
erasing, using a first erasing process, all coordinates of all the image-drawing input strokes, when any one of the coordinates of at least one image-drawing input stroke exists within the closed loop;
determining that the image-erasing input stroke forms a partially closed loop when the distance between the beginning and ending points of the image-erasing input stroke exceeds the threshold number of pixels;
erasing, using a second erasing process, the portion of the coordinates of the image-drawing input strokes within the partially closed loop;
wherein the circuitry is further configured to perform:
in response to determining that the image-erasing input stroke does not form a loop;
computing a length of the image-erasing input stroke;
generating an erasing area with a width which changes based on the length, the erasing area including regions with the width extending from two sides of each point that forms the image-erasing input stroke, wherein the longer the length of the image-erasing input stroke, the wider the width associated with the erasing area, and erasing, using a third erasing process, the portion of the coordinates of the image-drawing input strokes within the erasing area.

10. The method according to claim 9, wherein:

after the third erasing process, the width of the erasing area automatically returns to a predetermined width.

11. The computer implemented according to claim 9, wherein:

the third erasing process generates the erasing area to be a region defined by corners having coordinates:

($X1-a*\sin \theta, Y1+a*\cos \theta$), ($X1+a*\sin \theta, Y1-a*\cos \theta$)

($X2+a*\sin \theta, Y2-a*\cos \theta$), and, ($X2-a*\sin \theta, Y2+a*\cos \theta$), where:

(X1, Y1) is a first coordinate of the stroke of the image-erasing input stroke, (X2, Y2) is a second coordinate of the stroke of the image-erasing input stroke, $\cos \theta = (X2-X1)/r$, $\sin \theta = (Y2-Y1)/r$, $r = \sqrt{(X2-X1)^2 + (Y2-Y1)^2}$, and "a" corresponds to the length.

12. An image drawing processing system, comprising:

one or more user terminals; and a server couplable with each other via a network, the server to process information from each of the user terminals, wherein each of the user terminals include circuitry configured to:

receive information relating to image-drawing and information relating to image-erasing;

obtain more than one image-drawing input strokes and an image-erasing input stroke;

to determine that the image-erasing input stroke forms a closed loop when a distance between the beginning and ending points of the loop does not exceed a threshold number of pixels;

to erase, using a first erasing process, all coordinates of all the image-drawing input strokes, when any of the coordinates of the of at least one image-drawing input strokes exists within the closed loop;

to determine that the image-erasing input stroke forms a partially closed loop when the distance between the beginning and ending points of the image-erasing input stroke exceeds the threshold number of pixels;

erasing, using a second erasing process, the portion of the coordinates of the image-drawing input strokes within the partially closed loop;

in response to determining that the image-erasing input stroke does not form a loop;

compute a length of the image-erasing input stroke, generating an erasing area with a width which changes based on the length, the erasing area including regions with the width extending from two sides of each point that forms the image-erasing input stroke, wherein the longer the length of the image-erasing input stroke, the wider the width associated with the erasing area, and erasing, using a third erasing process, the potion of the coordinates of the image-drawing input strokes within the erasing area;

wherein the server includes circuitry configured to:

to receive the information relating to image-drawing and the information relating to image-erasing from each of the user terminals;

obtain image-drawing input information that is intersecting with the image-erasing input information as intersecting-image information; and divide the intersecting-image information.

13. The image drawing processing system according to claim 12, wherein:

the width of the third erasing process which changes based on length erases the area defined by corners having coordinates:

($X1-a*\sin \theta, Y1+a*\cos \theta$), ($X1+a*\sin \theta, Y1-a*\cos \theta$)

($X2+a*\sin \theta, Y2-a*\cos \theta$), and, ($X2-a*\sin \theta, Y2+a*\cos \theta$), where:

(X1, Y1) is a first coordinate of the stroke of the image-erasing input stroke, (X2, Y2) is a second coordinate of the stroke of the image-erasing input stroke, $\cos \theta = (X2-X1)/r$, $\sin \theta = (Y2-Y1)/r$, $r = \sqrt{(X2-X1)^2 + (Y2-Y1)^2}$, and "a" corresponds to the length.

* * * * *